United States Patent
Okamoto et al.

(10) Patent No.: US 6,901,385 B2
(45) Date of Patent: May 31, 2005

(54) SEMICONDUCTOR MEMORY CARD THAT RECORDS CONTENTS FOR TRIAL AND PURCHASE, RECORDING APPARATUS, REPRODUCING APPARATUS, AND SALES METHOD

(75) Inventors: Ryuichi Okamoto, Studio City, CA (US); Mitsuhiro Inoue, Studio City, CA (US); Hideki Matsushima, Studio City, CA (US)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 575 days.

(21) Appl. No.: 09/958,939

(22) PCT Filed: Feb. 15, 2001

(86) PCT No.: PCT/US01/04765

§ 371 (c)(1),
(2), (4) Date: Oct. 16, 2001

(87) PCT Pub. No.: WO01/61600

PCT Pub. Date: Aug. 23, 2001

(65) Prior Publication Data

US 2003/0097340 A1 May 22, 2003

Related U.S. Application Data

(63) Continuation-in-part of application No. 09/506,098, filed on Feb. 17, 2000, now abandoned.

(51) Int. Cl.[7] .............................................. G06F 17/60
(52) U.S. Cl. ............................ 705/51; 705/64; 705/67; 705/50
(58) Field of Search ............................. 705/50, 51, 52, 705/57, 58, 67, 72, 64; 713/200–201; 709/229; 380/201–204, 228

(56) References Cited

U.S. PATENT DOCUMENTS

| | | | | |
|---|---|---|---|---|
| 5,615,269 A | * | 3/1997 | Micali | 705/80 |
| 6,606,707 B1 | * | 8/2003 | Hirota et al. | 713/172 |
| 6,687,683 B1 | * | 2/2004 | Harada et al. | 705/51 |

FOREIGN PATENT DOCUMENTS

JP   02000338996 A  * 12/2000

OTHER PUBLICATIONS

IBM Technical Bulletin; Data Transfer Facility Interface for Semiconductor Memory testing; Feb. 1998; vol. 30; Issue No. 9.*
Citizen Watch Co Ltd., IC Card, Information Process, Section P, section No. 668, vol. 12, No. 53, p. 93, Feb. 18, 1988.

* cited by examiner

Primary Examiner—Pierre Eddy Elisca
(74) Attorney, Agent, or Firm—Wenderoth, Lind & Ponack, L.L.P.

(57) ABSTRACT

A semiconductor memory card which allows consumers to access and purchase content while protecting the copyright of the content. The memory card has a unique media ID assigned thereto and includes a secure data area and a non-secure data area. The secure are is accessible by an apparatus whose authenticity is verified, and the non-secure area is accessible by the apparatus regardless of such verification. The secure area stores a first encrypted content which is generated by encrypting a first content key by using the media ID, and the non-secure data area stores trial data and purchase data which can be decrypted. The trial data includes a first content which is encrypted by using the first content key, and the purchase data includes a second content which is encrypted by using a second content key. The purchase data can be decrypted when fee processing is performed.

13 Claims, 21 Drawing Sheets

FIG. 5

| CONTENT IDENTIFICATION INFORMATION ⟋501 | CONTENT NAME ⟋502 | ARTIST NAME ⟋503 | ... |
|---|---|---|---|
| USMEI9900832 | ContentA | AAAA | ... |

402 CONTENT INFORMATION

FIG. 8

| PRICE (801) | NUMBER OF Check Out ALLOWED (802) | PLAYABLE ON PC PLAYER (803) |
|---|---|---|
| 300YEN | 3 | YES |

CONTENT USAGE CONDITION 705

FIG. 15

| CONTENT IDENTIFICATION INFORAMTION (1502) | PLAY ALLOWANCE (1503) | Check Out COUNTER VALUE (1504) |
|---|---|---|
| USMEI9900832 | YES | 3 |
| USMEI9900023 | YES | 3 |
| USMEI9900121 | NO | 2 |
| USMEI9900003 | YES | 0 |

1501 RIGHT MANAGEMENT DB

FIG. 19

| USER ID 1901 | TERMINAL ID 1902 | NAME 1903 | CARD NUMBER 1904 |
|---|---|---|---|
| AA000001 | BA00FF01 | MASAYUKI KOZUKA | 4980-1111-2222-xxxx |
| AA000002 | BA00FF02 | HIDEKI MATSUSHIMA | 4980-2222-2222-xxxx |
| AA000003 | BA00FF03 | MASATAKA MINAMI | 4980-3333-2222-xxxx |
| AA000004 | BA00FF04 | RYUICHI OKAMOTO | 4980-4444-2222-xxxx |
| AA000005 | BA00FF05 | KATSUMI TOKUDA | 4980-5555-2222-xxxx |
| ........ | ........ | ........ | ........ |

1801 USER DB

FIG. 20

| DATE AND TIME 2001 | USER ID 2002 | CONTENT IDENTIFICATION INFORMATION 2003 | AMOUNT 2004 | VENDOR ID 2005 |
|---|---|---|---|---|
| 11/02/00 17:01 | AA000001 | USMEI9900029 | 200 | BB000002 |
| 11/02/00 22:39 | AA000002 | USMEI9900005 | 200 | BB000001 |
| 11/03/00 09:13 | AA000003 | USMEI9900125 | 300 | — |
| 11/03/00 22:08 | AA000004 | USMEI9900832 | 300 | BB000001 |
| 11/04/00 23:21 | AA000005 | USMEI9900028 | 400 | — |
| ........ | ........ | ........ | ........ | ........ |

1802 FEE DB

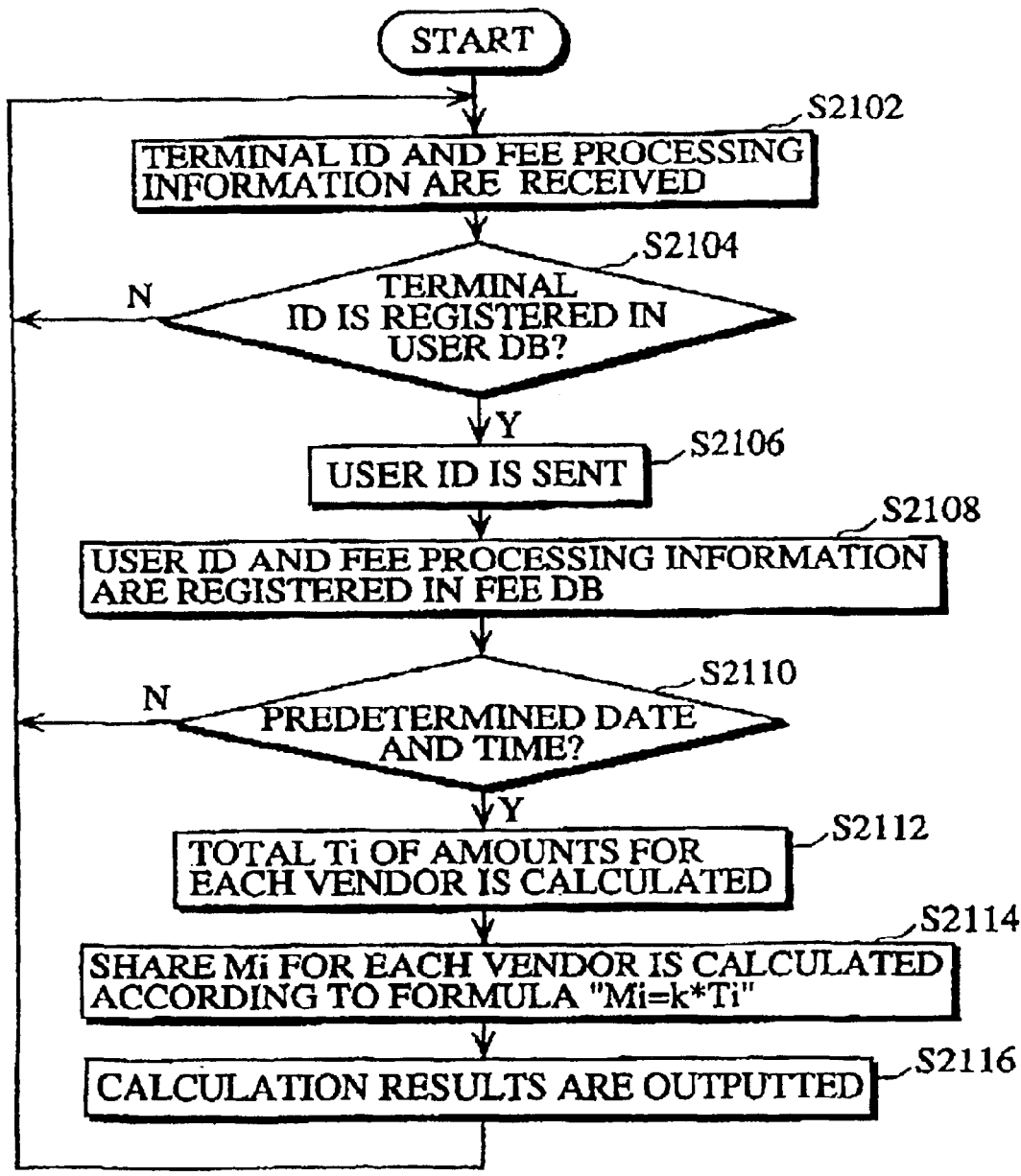

SEMICONDUCTOR MEMORY CARD THAT RECORDS CONTENTS FOR TRIAL AND PURCHASE, RECORDING APPARATUS, REPRODUCING APPARATUS, AND SALES METHOD

This application is a continuation-in-part under 35 U.S.C. § 120 of U.S. application Ser. No. 09/506,098 filed Feb. 17, 2000, now abandoned which is incorporated herein by reference.

BACKGROUND OF THE INVENTION

1. Field of the Invention

The present invention relates to a semiconductor memory card that protects the copyright to a content, and a recording apparatus, a recording and reproducing apparatus, and the sales method for the semiconductor memory card.

2. Description of the Related Art

In recent years, distribution of pay contents on the Internet (in other words, the EC (Electronic Commerce)) has become increasingly popular and more and more pay contents are provided on the Internet. In the EC on the Internet generally, a consumer accesses a homepage set up by the information provider and searches for contents he/she likes. Once the consumer finds contents of his/her choice, the consumer sends to the information provider a user ID and a credit card number, along with a request for purchasing the contents. Then, the consumer can download the contents.

Since contents handled in the EC are digital data that hardly deteriorates, the contents can maintain high quality. Recent developments in compression technologies for digital data have also enabled distribution of various data (contents) such as music and video data via the Internet. MP3 (Moving Picture Experts Group1 Audio Layer3) is one of the compression technologies for audio data. With MP3, music data on a CD can be compressed to one tenth of the original volume, with almost no deterioration in the quality. A user can obtain a free MP3 encoder and decoder for PC on the Internet. A user can create MP3 format data by encoding music data on a CD, and redistribute the music data via a network. Accordingly, it has become difficult to protect the copyright to music data against such uses.

Taking this problem seriously, the music industry has created an organization called SDMI (Secure Digital Music Initiative) to establish a system by which copyright can be protected in distribution of music data via the network. According to the SDMI rules, once electronic music contents obtained via the Internet are stored in a recording medium, the contents should not be moved to another medium unless protection of their copyrights are guaranteed.

To achieve this goal, the SDMI has chosen a system in which a unique ID is given to each recording medium, and contents to be stored in a recording medium are encrypted using the ID unique to the recording medium. Accordingly, even if the encrypted contents are moved or copied to another recording medium, the contents cannot be reproduced because the ID used in encrypting the contents does not coincide with the ID of the recording medium. In this manner, copyright protection is guaranteed.

Now, there are audio players that correspond to the copyright protection system that utilizes IDs unique to recording media.

Such audio players are generally packaged with recording media and are sold to consumers. Conventionally, nothing is recorded in the recording media at the time of shipment. Therefore, before enjoying contents, a consumer who purchased an audio player has to obtain the contents via the Internet and store the contents in the recording medium.

SUMMARY OF THE INVENTION

In view of the aforementioned situation, the first object of the present invention is to provide a semiconductor memory card that allows a consumer to easily access the source of a content and try and purchase the content, while protecting the copyright to the content. The second object of the present invention is to provide a recording apparatus and a recording and reproducing apparatus for the semiconductor memory card. The third object of the present invention is to provide a sales method for the semiconductor memory card where shares of a profit are paid to companies, who record contents in recording media and sell the recording media, according to their contribution degrees.

The first object is achieved by a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content. The semiconductor memory card having this construction allows a consumer to speedily purchase a desired content without connecting a recording and reproducing apparatus to the Internet and downloading the desired content.

Here, the purchase data may further include a second encrypted content key that is generated by encrypting the second content key according to a predetermined method, the second encrypted content key being to be decrypted using a decryption key that is obtained from the outside of the semiconductor memory card on the condition that the fee processing has been performed. This construction protects the copyright to the second content included in the purchase data.

Here, the purchase data may further include encrypted management information, a part of the encrypted management information being the second encrypted content key and a remaining part of the encrypted management information including a vendor ID and a usage condition, the vendor ID being uniquely assigned to a card vendor that records the trial data and the purchase data in the semiconductor memory card, and the usage condition including a purchase price of the purchase data. This construction makes it possible to identify each card vendor that records contents in semiconductor memory cards and sells the semiconductor memory cards. This allows a share of a profit to be appropriately paid to each card vendor that contributes to the promotion of contents for purchase by recording popular contents for promotion.

Here, the purchase data may further include encrypted management information, a part of the encrypted management information being the second encrypted content key and a remaining part of the encrypted management information including a usage condition concerning the purchase data, the usage condition including a numb er of check outs allowed and a reproduction allowance, each check out being a conversion of the purchase data into a format in which the purchase data is able to be decrypted according to the information in the semiconductor memory card, and the reproduction allowance showing whether an apparatus that performs purchase processing for the purchase data is allowed to reproduce the purchase data. This construction limits the recording and reproducing of the second content for purchase with a recording and reproducing apparatus, thereby protecting the copyright to the second content.

The second object of the present invention is achieved by a recording apparatus that records data in a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, the recording apparatus including: a content storage unit operable to store a plurality of contents; a content key generating unit operable to generate a plurality of content key used to encrypt the plurality of contents; a first encrypted content key generating unit operable to obtain the media ID from the semiconductor memory card and generate a first encrypted content key by encrypting a first content key, out of the plurality of content key, using the obtained media ID; a first recording unit operable to record the first encrypted content key in the secure data area; a first encryption unit operable to read a first content, out of the plurality of contents, from the content storage unit and generate a first encrypted content by encrypting the first content using the first content key; a second recording unit operable to record data including the first encrypted content in the non-secure data area as trial data; a second encrypted content key generating unit operable to generate a second encrypted content key by encrypting a second content key, out of the plurality of content key; a second encryption unit operable to read a second content related to the first content from the content storage unit end generate a second encrypted content by encrypting the second content using the second content key; and a third recording unit operable to record data including the second encrypted content in the non-secure data area as purchase data. The recording apparatus having this construction makes it easy to produce a semiconductor memory card that allows a consumer to speedily purchase a desired content without connecting a recording and reproducing apparatus to the Internet and downloading the desired content.

Here, the data recorded by the third recording unit may include the second encrypted content key in addition to the second encrypted content. The recording apparatus having this construction records, in a semiconductor memory card, a content included in purchase data and a content included in trial data using different encryption methods. This achieves a semiconductor memory card that effectively protects copyrights to contents.

The second object of the present invention is also achieved by a recording and reproducing apparatus that records and reproduces purchase data in a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, where the recording and reproducing apparatus includes: a data reading unit operable to read the purchase data from the non-secure data area; a purchase data storage unit operable to store the read purchase data; a decrypted content generating unit operable to generate a decrypted content by decrypting the second encrypted content included in the stored purchase data using a prestored decryption key; a reproducing unit operable to reproduce and output the decrypted content; a media ID reading unit operable to read a media ID from a secure data area of a destination semiconductor memory card; an encryption recording unit operable to generate a second encrypted content key by encrypting a second decrypted content key using the read media ID and record the second encrypted content key in the secure data area of the destination semiconductor memory card, the second decrypted content key being generated by decrypting the second content key using the prestored decryption key; and a content recording unit operable to record the second encrypted content included in the stored purchase data in a non-secure data area of the destination semiconductor memory card. The recording and reproducing apparatus having this construction allows a consumer to speedily record and reproduce a desired content without connecting the recording and reproducing apparatus to the Internet and downloading the desired content.

The second object of the present invention is further achieved by a recording and reproducing apparatus that records and reproduces purchase data in a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, where the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, where the recording and reproducing apparatus includes: a data reading unit operable to read the purchase data from the non-secure data area; a purchase data storage unit operable to store the read purchase data; a second decrypted content key generating unit operable to generate a second decrypted content key by decrypting the second encrypted content key included in the stored purchase data using a prestored decryption key; a decrypted content generating unit operable to generate a decrypted content by decrypting the second encrypted content included in the stored purchase data using the second decrypted content key; a reproducing unit operable to reproduce and output the decrypted content; a media ID reading unit operable to read a media ID from a secure data area of a destination semiconductor memory card; an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card. The recording and reproducing apparatus having this construction reproduces a content included in purchase data in a semiconductor memory card. The recording and reproducing apparatus also records the content into a destination semiconductor memory card so that the recorded content is able to be reproduced with a reproducing apparatus.

Here, the purchase data may further include encrypted management information, a part of the encrypted management information being the second encrypted content key and a remaining part of the encrypted management information including a usage condition concerning the purchase data, the usage condition including a number of check outs allowed and a reproduction allowance, each check out being a conversion of the purchase data into a format in which the purchase data is able to be decrypted according to the information in the semiconductor memory card, and the reproduction allowance showing whether an apparatus that performs purchase processing for the purchase data is allowed to reproduce the purchase data, where the recording and reproducing apparatus further includes: a usage condition storage unit operable to store a usage condition included in decrypted management information; a first judging unit operable to judge whether a user's instruction designates a reproduction or recording of the stored purchase data; a second judging unit operable to judge whether the stored usage condition shows that the reproduction is allowed, if the first judging unit has judged that the user's instruction designates the reproduction; a reproduction control unit operable to activate the decrypted content generating unit and the reproducing unit if the second judging unit has judged that the reproduction is allowed; a third judging unit operable to judge whether the recording is allowed by referring to the stored usage condition, if the first judging unit has judged that the user's instruction designates the recording; a recording control unit operable to activate the media ID reading unit, the encryption recording unit, and the content recording unit if the third judging unit has judged that the recording is allowed; and a displaying unit operable to display a message for the user if the second judging unit has judged that the reproduction is not allowed or if the third judging unit has judged that the recording is not allowed. The recording and reproducing apparatus having this construction records and reproduces the second content for purchase, while protecting the copyright to the second content.

Here, the third judging unit may judge that the recording is allowed if the number of check outs allowed, which is included in the stored usage condition, is at least one, the recording and reproducing apparatus may further include: an updating unit operable to decrement the included number of check outs allowed by one, after the content recording unit records the second encrypted content in the non-secure data area. With this construction, the number of times the second content can be recorded is limited to the number of check outs allowed included in the usage condition. This prevents the illegal copying of the second content.

The third object of the present invention is achieved by a sales method for a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, where the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, where the purchase data further includes encrypted management information, a part of the encrypted management information being the second encrypted content key and a remaining part of the encrypted management information including a vendor ID and a usage condition, the vendor ID being uniquely assigned to a card vendor that records the trial data and the purchase data in the semiconductor memory card, and the usage condition including a purchase price of the purchase data, where via a public line network, a fee processing apparatus is connected to a recording and reproducing apparatus that includes: a data reading unit operable to read the purchase data from the non-secure data area; a purchase data storage unit operable to store the read purchase data; a second decrypted content key generating unit operable to generate a second decrypted content key by decrypting the second encrypted content key included in the stored purchase data using a prestored decryption key; a decrypted content generating unit operable to generate a decrypted content by decrypting the second encrypted content included in the stored purchase data using the second decrypted content key; a reproducing unit operable to reproduce and output the decrypted content; a media ID reading unit operable to read a media ID from a secure data area of a destination semiconductor memory card; an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card, where the sales method includes: a storing step where when reproducing or recording a content included in the purchase data for a first time, the recording and reproducing apparatus stores fee processing information that includes a purchase price for the content; a transmission step where the recording and reproducing apparatus transmits, to the fee processing apparatus, the fee processing information, a terminal ID prestored in the recording and reproducing apparatus, and a vendor ID; a calculating step where the fee processing apparatus calculates a contribution degree for each card vendor from a piece of the fee processing information that corresponds to a vendor ID assigned to the card vendor; and a determining step where the fee processing apparatus determines a share of a profit to be paid to the card vendor according to the calculated contribution degree. This method makes it possible to appropriately pay a share of a profit to each card vendor that contributes to the promotion of contents for purchase by recording popular contents for promotion in semiconductor memory cards.

The second object of the present invention is also achieved by a program applied to a recording and reproducing apparatus that records and reproduces purchase data in a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted an a condition that fee processing has been performed, the second content being related to the first content, where the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, where the program has the recording and reproducing apparatus achieve the following units: a data reading and storing unit operable to read the purchase data from the non-secure data area and store the read purchase data in a recording area; a second decrypted content key generating unit operable to generate a second decrypted content key by decrypting the second encrypted content key included in the stored purchase data using a prestored decryption key; a decrypted content generating unit operable to generate a decrypted content by decrypting the second encrypted content included in the stored purchase data using the second decrypted content key; a reproducing unit operable to reproduce and output the decrypted content; a media ID reading unit operable to read a media ID from a secure data area of a destination semiconductor memory card; an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card. This program achieves a recording and reproducing apparatus that records or reproduces a desired content stored in a semiconductor memory card. As a result, it becomes unnecessary to connect the recording and reproducing apparatus to the Internet and download the desired content.

The second object of the present invention is also achieved by a computer-readable recording medium applied to a recording and reproducing apparatus that records and reproduces purchase data in a semiconductor memory card that prestores a media ID uniquely assigned thereto and includes a secure data area and a non-secure data area, the secure data area being accessible by an apparatus if authenticity of the apparatus is verified, and the non-secure data area being accessible by the apparatus regardless of whether the authenticity is verified, where the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, where the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, where the computer-readable recording medium stores a program having the recording and reproducing apparatus achieve the following units: a data reading and storing unit operable to read the purchase data from the non-secure data area and store the read purchase data in a recording area; a second decrypted content key generating unit operable to generate a second decrypted content key by decrypting the second encrypted content key included in the stored purchase data using a prestored decryption key; a decrypted content generating unit operable to generate a decrypted content by decrypting the second encrypted content included in the stored purchase data using the second decrypted content key; a reproducing unit operable to reproduce and output the decrypted content; a media ID reading unit operable to read a media ID from a secure data area of a destination semiconductor memory card; an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card. This recording medium achieves a recording and reproducing apparatus that records or reproduces a desired content stored in a semiconductor memory card. As a result, it becomes unnecessary to connect the recording and reproducing apparatus to the Internet and download the desired content.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows an example of content information shown in FIG. 4;

FIG. 8 shows an example of content usage condition shown in FIG. 7;

FIG. 15 shows an example content of a right management DB stored in a secure storage of the PC player;

FIG. 19 shows an example content of a user DB in the fee processing apparatus;

FIG. 20 shows an example content of a fee DB in the fee processing apparatus; and FIG. 21 is a flowchart showing the operation of the fee processing apparatus.

DESCRIPTION OF THE PREFERRED EMBODIMENTS

Figure 1:
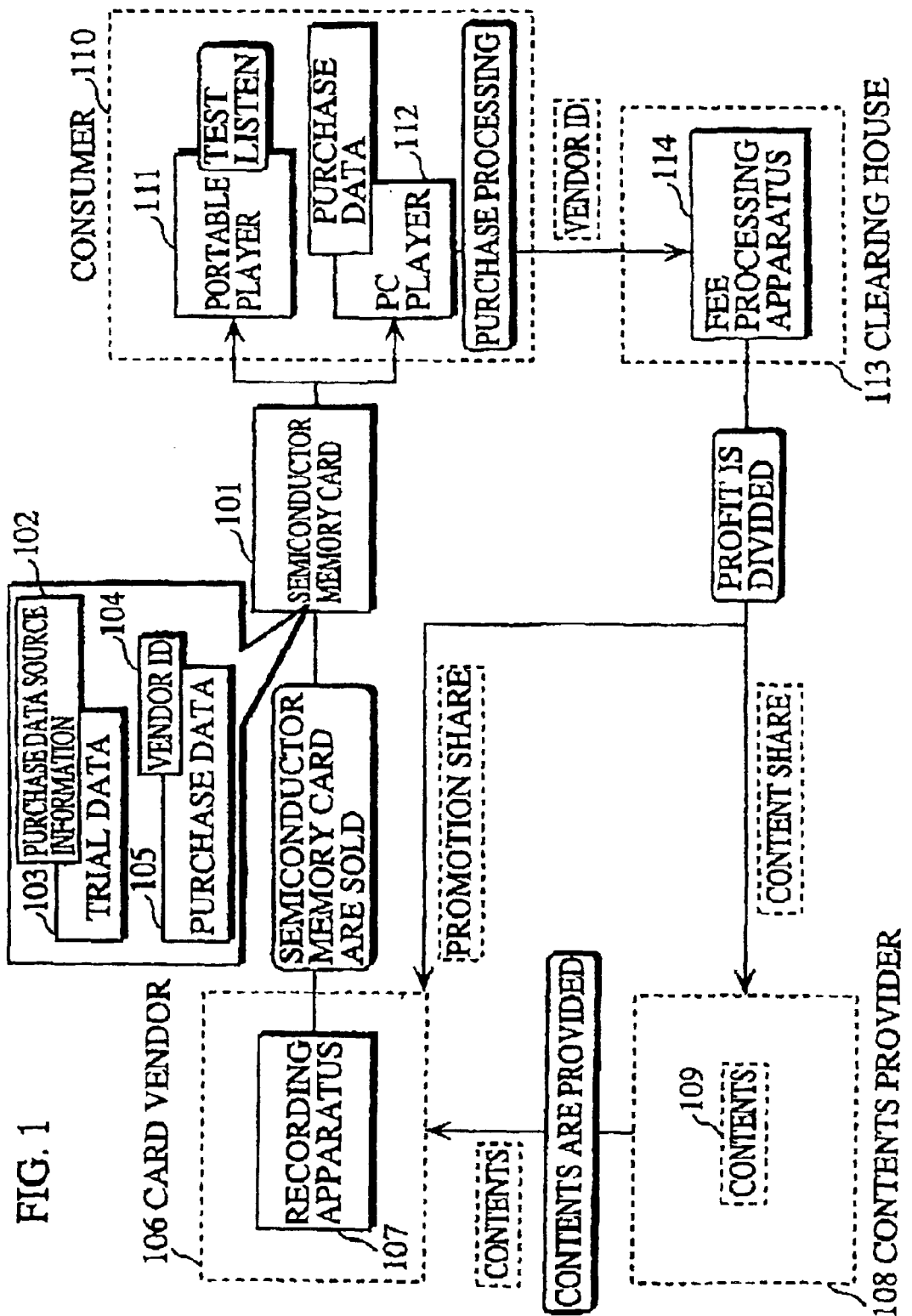
FIG. 1 shows the outline of an embodiment of a semiconductor memory card that stores trial data and purchase data, and a recording apparatus, a PC player, and a sales method for the semiconductor memory card of the present invention.

FIG. 1 shows the outline of an embodiment of a semiconductor memory card, and a recording apparatus, a PC player, and a sales method for the semiconductor memory card of the present invention.

A semiconductor memory card 101 stores trial data 103 and purchase data 105. The trial data 103 includes purchase data source information 102 and the purchase data 105 includes a vendor ID 104.

The trial data 103 and the purchase data 105 are stored in the semiconductor memory card 101 by a recording apparatus 107 at a card vendor 106 that is assigned the vendor ID 104.

The trial data 103 includes a content for promotion and the purchase data 105 includes a content related to the trial data 103. These contents (music data) are selected from a plurality of contents 109 owned by a contents provider 108, such as a record company, that holds the copyrights to the contents.

The semiconductor memory card 101 is sold by the card vendor 106 to a consumer 110. The consumer 110 tries the content included in the trial data 103 using a portable player 111 and purchases the contents included in the purchase data 105 using a PC player 112.

During purchase processing, the PC player 112 sends various information, such as a terminal ID and the vendor ID, to a fee processing apparatus 114 located at a clearing house (a fee processing company) 113. The fee processing apparatus 114 performs fee processing for the consumer and divides a profit into a share (hereinafter, the "content share") to be paid to the contents provider 108 and a share (hereinafter, the "promotion share") to be paid to the card vendor 106.

The outline of the present embodiment has been described above. The following is a detailed description of the present embodiment.

First, the semiconductor memory card 101 is described below.

Figure 2:
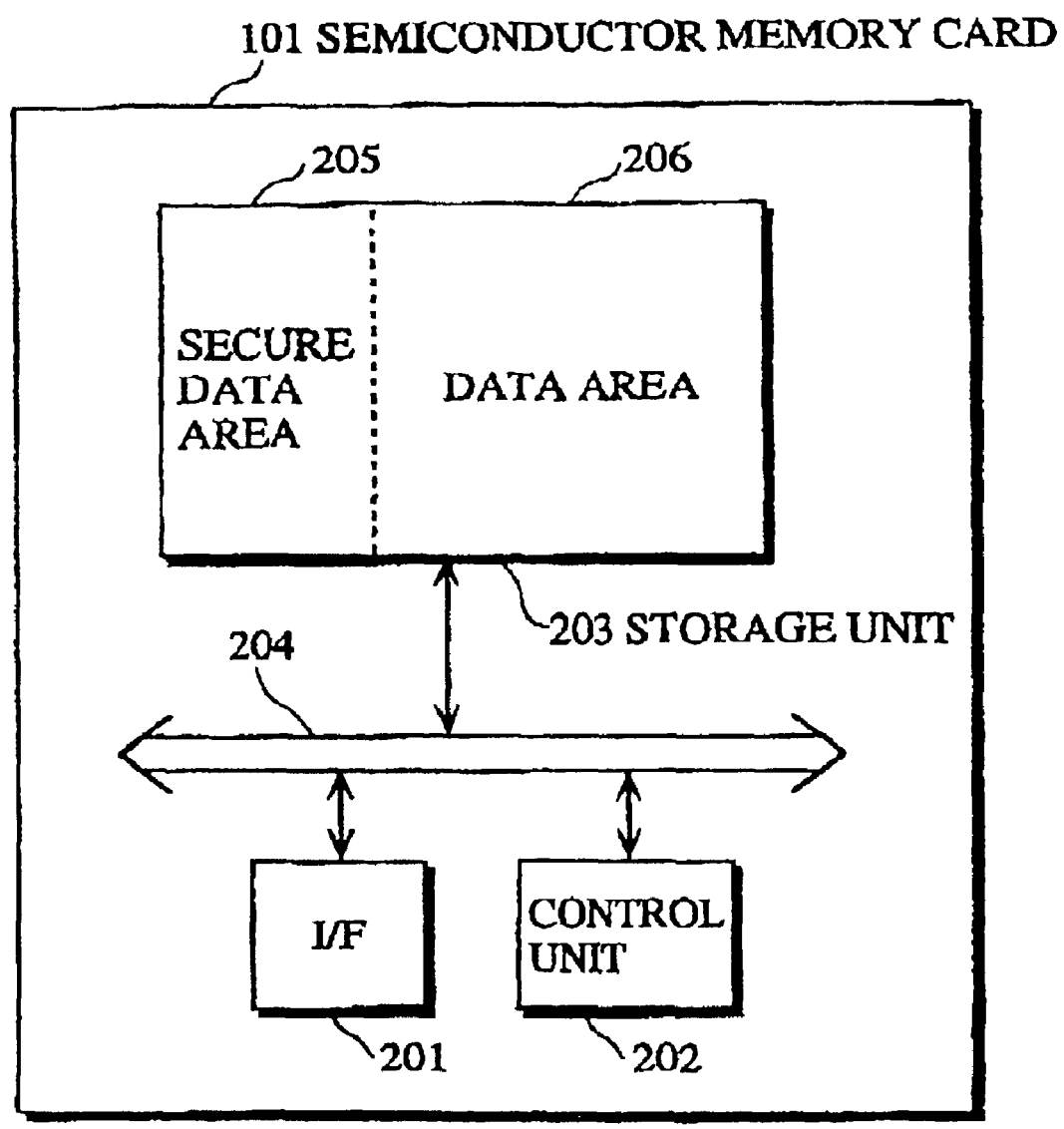
FIG. 2 shows the internal construction of a semiconductor memory card of the embodiment.

FIG. 2 shows the internal construction of the semiconductor memory card 101. As shown in this drawing, the semiconductor memory card 101 has a construction where an I/F 201, a control unit 202, and a storage unit 203 are connected to each other via a bus 204. The storage unit 203 is a flash ROM that includes a secure data area 205 and a data area 206. Contents are written into and read from the storage unit 203 under the control of the control unit 202 according to instructions inputted from an external apparatus via the I/F 201. It should be noted here that only authorized external apparatuses can write and read contents into and from the secure data 205.

Figure 3:
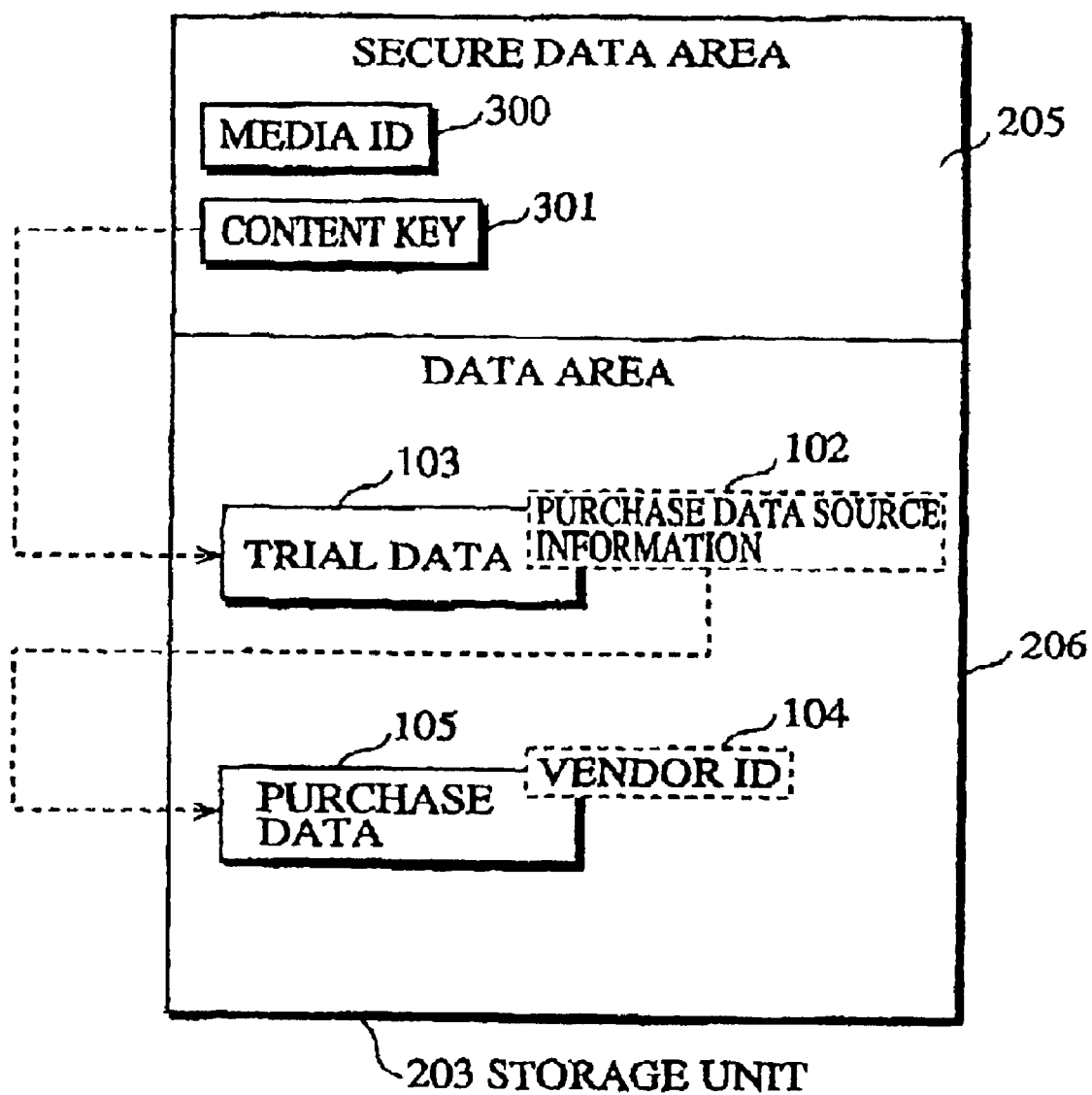
FIG. 3 shows data stored in data areas of the semiconductor memory card shown in FIG. 2.

FIG. 3 shows the data content stored in each area of the storage unit.

The secure data area 205 in the storage unit 203 stores a media ID 300 unique to the semiconductor memory card 101 and a first content key 301 that has been encrypted using the media ID 300. The media ID 300 has been stored in the secure data area 205 during the production of the semiconductor memory card 101.

The data area 206 stores the trial data 103 and the purchase data 105. AS described above, the trial data 103 includes the purchase data source information 102 and the purchase data 105 includes the vendor ID 104.

Figure 4:
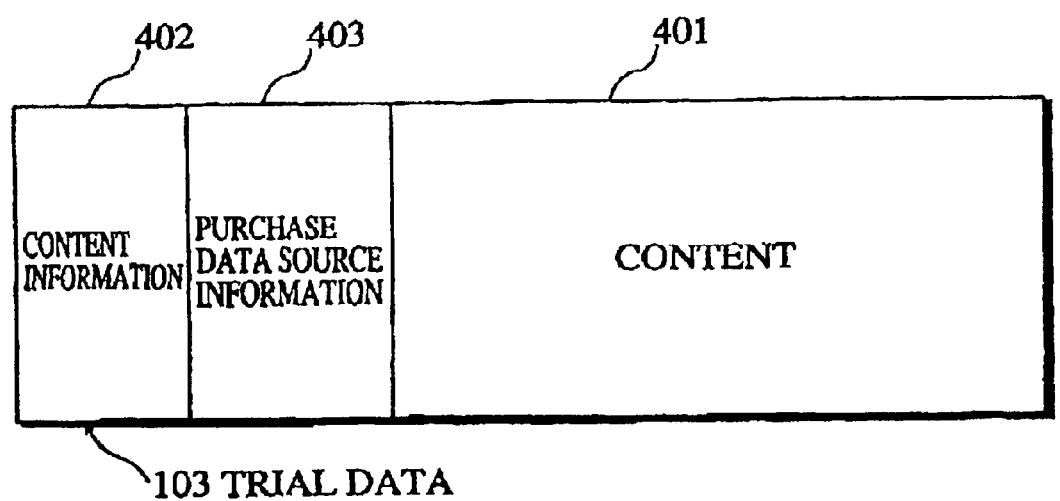
FIG. 4 shows the data structure of trial data stored in the data area shown in FIG. 3.

FIG. 4 shows an example structure of the trial data 103. As shown in this drawing, the trial data 103 has a data structure conforming to a SD (Secure Digital) audio standard and includes a content 401, which is electronic audio data for promotion and has been encrypted using the first content key, content information 402, and purchase data source information 403.

The content 401 is electronic audio data generated according to a compression coding method, such as MP3, AAC (Advanced Audio Coding), or LPCM (Linear Pulse Code Modulation), and has been encrypted using the first content key as an encryption key according to an encryption algorithm of a secret key cryptosystem, such as DES (Data Encryption Standard).

The content information 402 includes content identification information 501, a content name 502, and an artist name 503, as shown in FIG. 5.

The content identification information 501 is information for identifying the content 401, such as ISRC (International Standard-Recording Code). The ISRC is ID information uniquely assigned to each song and includes a country code (two ASCII characters), recording year (two-digit number), and serial number (five-digit number).

The content name 502 and the artist name 503 are respectively a song name and the name of a singer or a musician, for instance.

Figure 6:
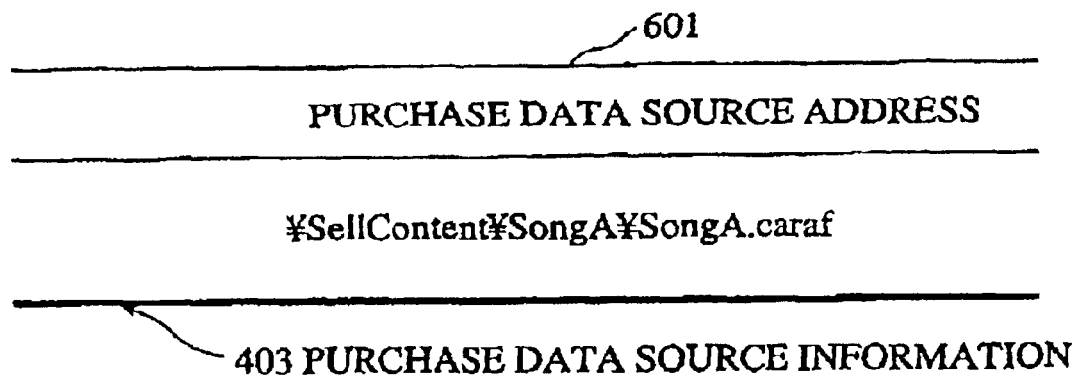
FIG. 6 shows an example of purchase data source information shown in FIG. 4.

The purchase data source information 403 gives a purchase data source address 601, as shown in FIG. 6. Here, the purchase data source address 601 gives an address in the data area 206 of the semiconductor memory card 101. The purchase data 105 is stored in the data area 206 at a location specified by the address.

Figure 7:
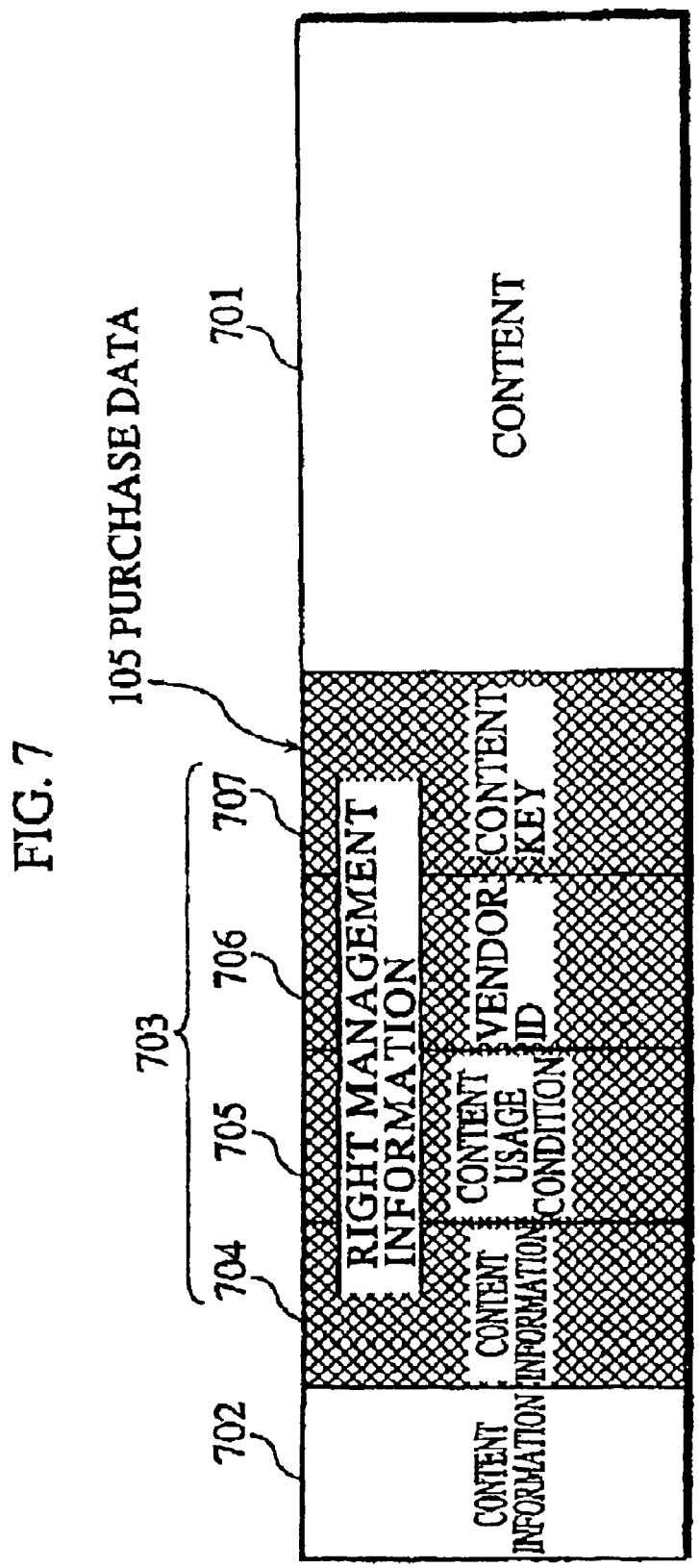
FIG. 7 shows the data structure of purchase data stored in the data area shown in FIG. 3.

FIG. 7 shows an example data structure of the purchase data 105.

As shown in this drawing, the purchase data 105 includes a content 701 that has been generated by encrypting a content related to the content 401 of the trial data 103 using the content key, content information 702 related to the content 701, and right management information 703.

In this embodiment, the content 701 included in the purchase data 105 is the same as that included in the trial data 103.

Therefore, the content information 702 is the same as the content information 402 described above.

The right management information 703 includes content information 704, a content usage condition 705, a vendor ID 706, and a second content key 707.

The right management information 703 is encrypted according to an encryption algorithm of a public key cryptosystem, such as RSA, to prevent the manipulation of the right management information 703.

The content information 704 is the same as the content information 702.

The content usage condition 705 includes a price 801, a number of Check Outs allowed 802, and playable on PC player 803, as shown in FIG. 8.

The price 801 shows the purchase price of the content 701. The number of Check outs allowed 802 shows how many times a reproduction right can be transferred. The playable on PC player 903 shows whether it is allowed to reproduce the content 701 with the PC player 112.

The vendor ID 706 is an identifier assigned to the card vendor of the semiconductor memory card 101. The trial data 103 and the purchase data 105 are recorded by the card vendor in the semiconductor memory card 101 using the recording apparatus 107.

The second content key 707 is a decryption key (an encryption key) for the encrypted content 701.

The following is a description of the recording apparatus 107 for the semiconductor memory card 101.

Figure 9:
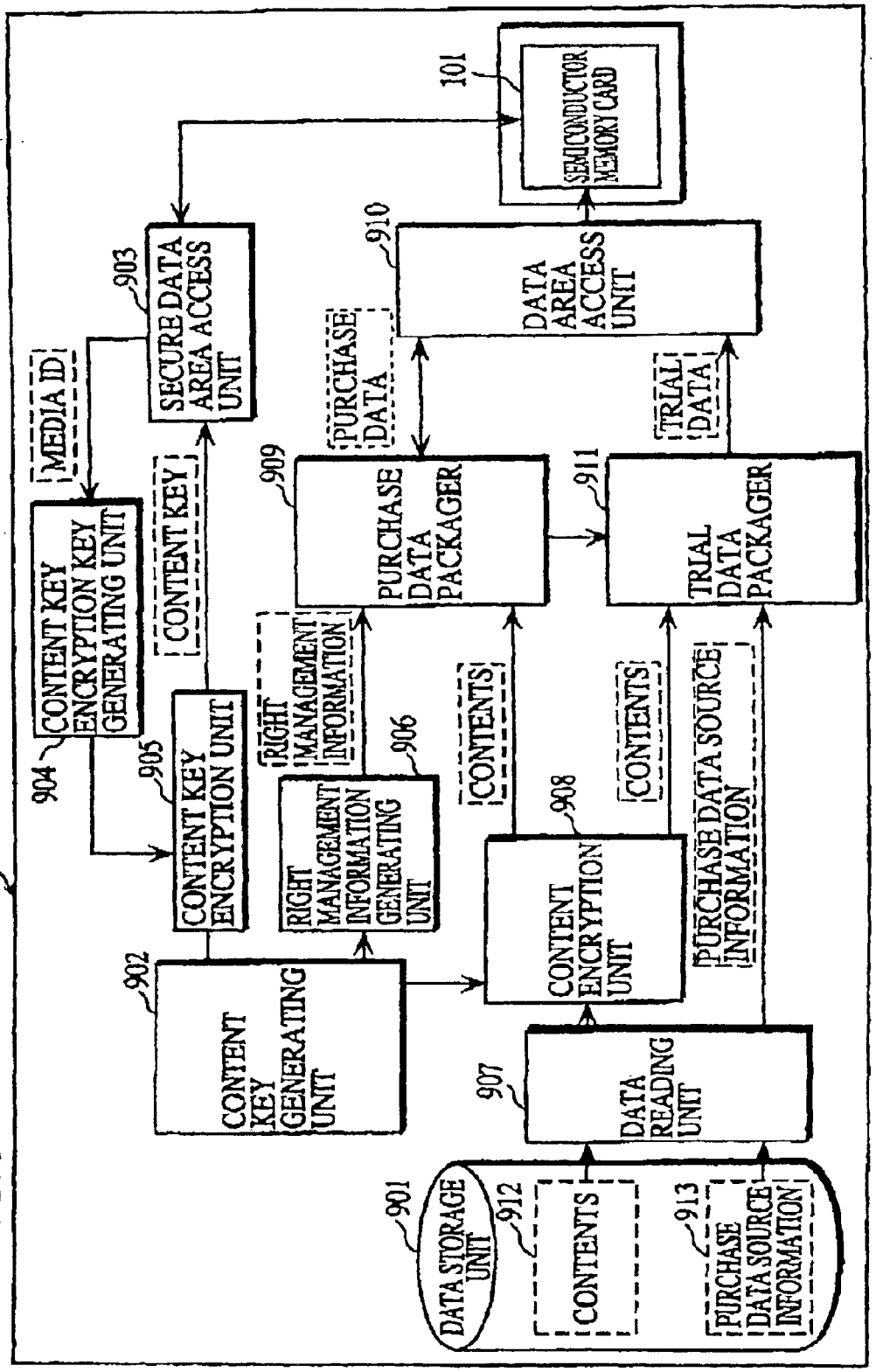
FIG. 9 shows the construction of a recording apparatus of the embodiment.

FIG. 9 shows the construction of the recording apparatus 107 of the present embodiment.

As shown in this drawing, the recording apparatus 107 includes a data storage unit 901, a content key generating unit 902, a secure data area access unit 903, a content key encryption key generating unit 904, a content key encryption unit 905, a right management information generating unit 906, a data reading unit 907, a content encryption nit 908, a purchase data packager 909, a data area access unit 910, a trial data packager 911, and the semiconductor memory card 101.

The data storage unit 901 stores a plurality of contents 912 that are electronic music data generated according to a compression coding method, such as AAC, and purchase data source information 913.

The content key generating unit 902 generates a content key that is an encryption key used to encrypt contents to be recorded in the semiconductor memory card 101 each time an operator inputs an instruction to record the trial data 103 or the purchase data 105 in the semiconductor memory card 101. If the operator inputs an instruction to record the purchase data 105, the content key generating unit 902 generates the second content key and sends the generated second content key to the right management information generating unit 906 and the content encryption unit 908, and instructs the content encryption unit 908 to encrypt the purchase data 105. If the operator inputs an instruction to record the trial data 103, the content key generating unit 902 generates the first content key and sends the generated first content key to the content key encryption unit 905 and the content encryption unit 908. In this case, the content key generating unit 902 instructs the secure data area access unit 903 via the content key encryption unit 905 to obtain the media ID 300 and instructs the content encryption unit 908 to encrypt the trial data 103.

The secure data area access unit 903 accesses the secure data area 205 of the semiconductor memory card 101, reads the media ID 300 from the secure data area 205, and sends the read media ID 300 to the content key encryption key generating unit 904. Also, the secure data area access unit 903 receives an encrypted first content key 301 from the content key encryption unit 905 and writes the encrypted first content key 301 in the secure data area 205.

The content key encryption key generating unit 904 receives the media ID 300 from the secure data area access unit 903, generates a content key encryption key from the media ID 300, and sends the content key encryption key to the content key encryption unit 905.

The content key encryption unit 905 encrypts the first content key sent from the content key generating unit 902 using the content key encryption key sent from the content key encryption key generating unit 904. The content key encryption unit 905 then sends the encrypted first content key to the secure data area access unit 903.

The right management information generating unit 906 obtains the right management information 703, encrypts the right management information 703 according to an encryption algorithm of a public key cryptosystem, such as RSA, and sends the encrypted right management information 703 to the purchase data packager 909. AS described above, the right management information 703 includes the content information 704, the content usage condition 705 (see FIG. 8), the vendor ID 706, and the second content key 707 sent from the content key generating unit 902.

The data reading unit 907 reads a content specified by the operator from the data storage unit 901 and sends the content to the content encryption unit 908.

The content encryption unit 908 encrypts the content sent from the data reading unit 907 using the first or second content key sent from the content key generating unit 902. The content encryption unit 908 then sends the encrypted content to the purchase data packager 909 or the trial data packager 911. Note that whether the encrypted content is sent to the purchase data packager 909 or the trial data packager 911 depends on the instruction sent from the content key generating unit 902.

The purchase data packager 909 obtains the content information 702 in advance, and receives the encrypted right management information 703 and the encrypted content 701 from the right management information generating unit 906 and the content encryption unit 908, respectively. The purchase data packager 909 then sends these information and content to the data area access unit 901 as the purchase data 105.

The data area access unit 910 receives the purchase data 105 from the purchase data packager 909 and writes the received purchase data 105 in the data area 206 of the semiconductor memory card 101. Also, the data area access unit 910 receives the trial data 103 from the trial data packager 911 and writes the trial data 103 in the data area 206 of the semiconductor memory card 101.

The trial data packager 911 obtains the content information 402 and the purchase data source information 403 in advance, and receives the encrypted content 401 from the content encryption unit 908. The trial data packager 911 then sends these information and content to the data area access unit 910 as the trial data 103.

In this manner, as shown in FIG. 3, the encrypted first content key 301 is stored in the secure data area 205 and the trial data 103 and the purchase data 105 are stored in the data area 206.

It should be noted here that in this embodiment, because the purchase data 105 is stored in the data area 206 of the storage unit 203 of the semiconductor memory card 101, the purchase data source information 403 gives an address in the data area 206 as the purchase data source address 601. If a content is purchased via a network (such as the Internet), however, the purchase data source information 913 may be read from the data storage unit 901 by the data reading unit 907 and the read purchase data source information may be included in the trial data 103.

Figure 10:
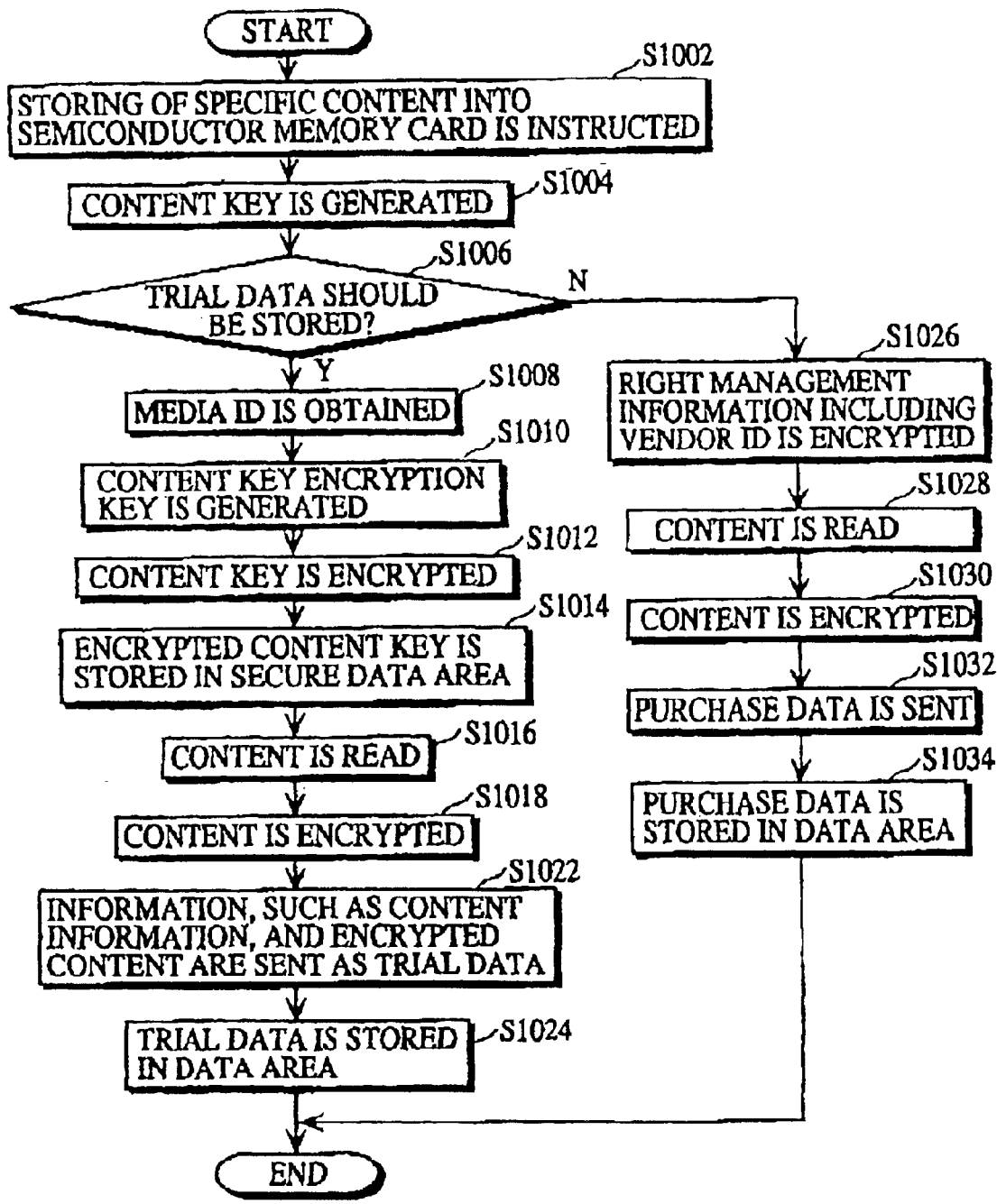
FIG. 10 is a flowchart showing the operation of the recording apparatus.

The operation of the recording apparatus 107 is described below with reference to the flowchart shown in FIG. 10.

Each of the content key generating unit 902 and the data reading unit 907 receives an operator's instruction to record the trial data or purchase data concerning a specific content into the semiconductor memory card 101 (S1002).

The content key generating unit 902 generates the first or second content key (S1004). The content key generating unit 902 then judges whether the trial data 103 should be recorded (S1006). If the judgment result is affirmative, the content key generating unit 902 instructs the secure data area access unit 903 to obtain the media ID 300.

The secure data area access unit 903 reads the media ID 300 from the secure data area 205 (S1008).

The content key encryption key generating unit 904 generates a content key encryption key from the media ID 300 (S1010).

The content key encryption unit 905 encrypts the first content key using the content key encryption key (S1012).

The secure data area access unit 903 records the encrypted content key 301 into the secure data area 205 (S1014).

Then the data reading unit 907 reads the specific content, out of the plurality of contents 912, from the data storage unit 901 and sends the read content to the content encryption unit 908 (S1016).

The content encryption unit 908 encrypts the content sent from the data reading unit 907 using the first content key and sends the encrypted content to the trial data packager 911 (S1018).

The trial data packager 911 sends the content information and purchase data source information that are obtained in advance with the encrypted content to the data area access unit 910 as the trial data 103 (S1022).

The data area access unit 910 records the trial data 103 into the data area 206 (S1024).

If the judgment result in S1006 is negative, the right management information generating unit 906 encrypts the right management information including the vendor ID and sends the encrypted right management information to the purchase data packager 909 (S1026).

The data reading unit 907 reads the specific content and sends the read content to the content encryption unit 908 (S1028).

The content encryption unit 908 encrypts the content sent from the data reading unit 907 using the second content key (S1030).

The purchase data packager 909 obtains content information in advance and receives the encrypted right management information and the encrypted content from the right management information generating unit 906 and the content encryption unit 908, respectively. The purchase data packager 909 then sends these information and content to the data area access unit 910 as the purchase data 105 (S1032).

The data area access unit 910 records the purchase data 105 in the data area 206 (S1034). In this manner, the processing is completed.

The following is a description of the portable player 111 that is connected to the semiconductor memory card 101 and reproduces the trial data 103. In the manner described above, the trial data 103 and the purchase data 105 have been stored in the semiconductor memory card 101.

Figure 11:
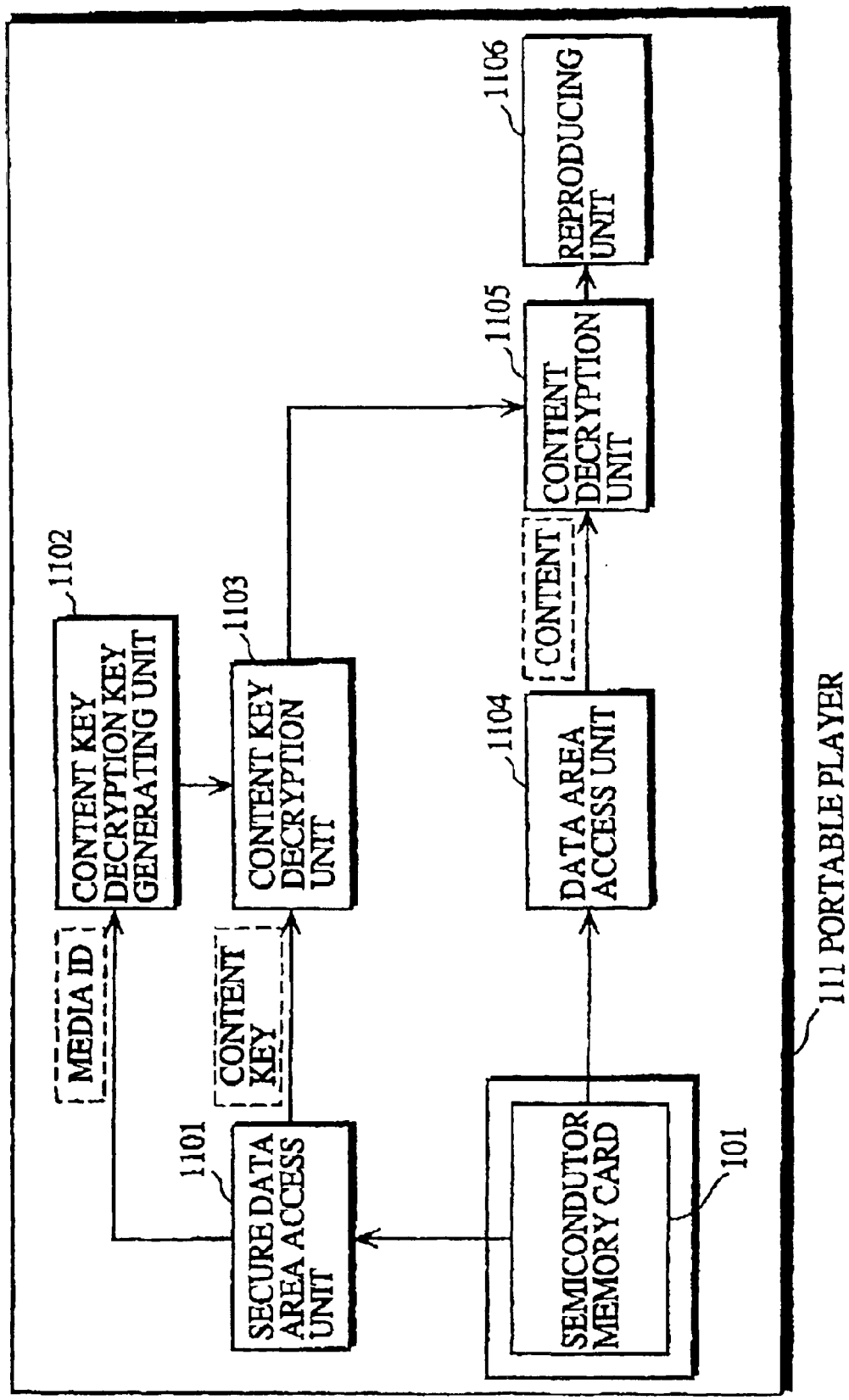
FIG. 11 shows the construction of a portable player of the embodiment.

FIG. 11 shows the construction of the portable player 111 of the present embodiment. As shown in this drawing, the portable player 111 includes a secure area access unit 1101, a content key decryption key generating unit 1102, a content key decryption unit 1103, a data area access unit 1104, a content decryption unit 1105, and a reproducing unit 1106. The portable player 111 having this construction is connected to the semiconductor memory card 101 and performs mutual authentication with the semiconductor memory card 101. Only if the mutual authentication has succeeded, the portable player 111 is allowed to access the secure data area 205 of the storage unit 203 of the semiconductor memory card 101.

The secure data area access unit 1101 performs the following operations if an instruction to reproduce the trial data 103 is inputted. The secure data area access unit 1101 accesses the secure data area 205 of the semiconductor memory card 101, reads the media ID 300 and the encrypted first content key 301 from the secure data area 205, sends the read media ID 300 to the content key decryption key generating unit 1102, and sends the encrypted content key 301 to the content key decryption unit 1103.

The content key decryption key generating unit 1102 generates a content key decryption key from the media ID 300 sent from the secure data area access unit 1101 and sends the generated content key decryption key to the content key decryption unit 1103.

The content key decryption unit 1103 decrypts the encrypted first content key 301 sent from secure data area access unit 1101 using the content key decryption key sent from the content key decryption key generating unit 1102, and sends the decrypted first content key 301 to the content decryption unit 1105.

The data area access unit 1104 performs the following operations if the instruction to reproduce the trial data 103 is inputted. The data area access unit 1104 accesses the data area 206 of the semiconductor memory card 101, reads the content 401 included in the trial data 103 from the data area 206, and sends the read content 401 to the content decryption unit 1105. The content 401 has been encrypted using the first content key.

The content decryption unit 1105 decrypts the content 401 sent from the data area access unit 1104 using the first content key sent from the content key decryption unit 1103. The content decryption unit 1105 then sends the decrypted content 401 to the reproducing unit 1106.

The reproducing unit 1106 expands and reproduces the compression-coded content 401 sent from the content decryption unit 1105 and outputs music using speakers.

Figure 12:
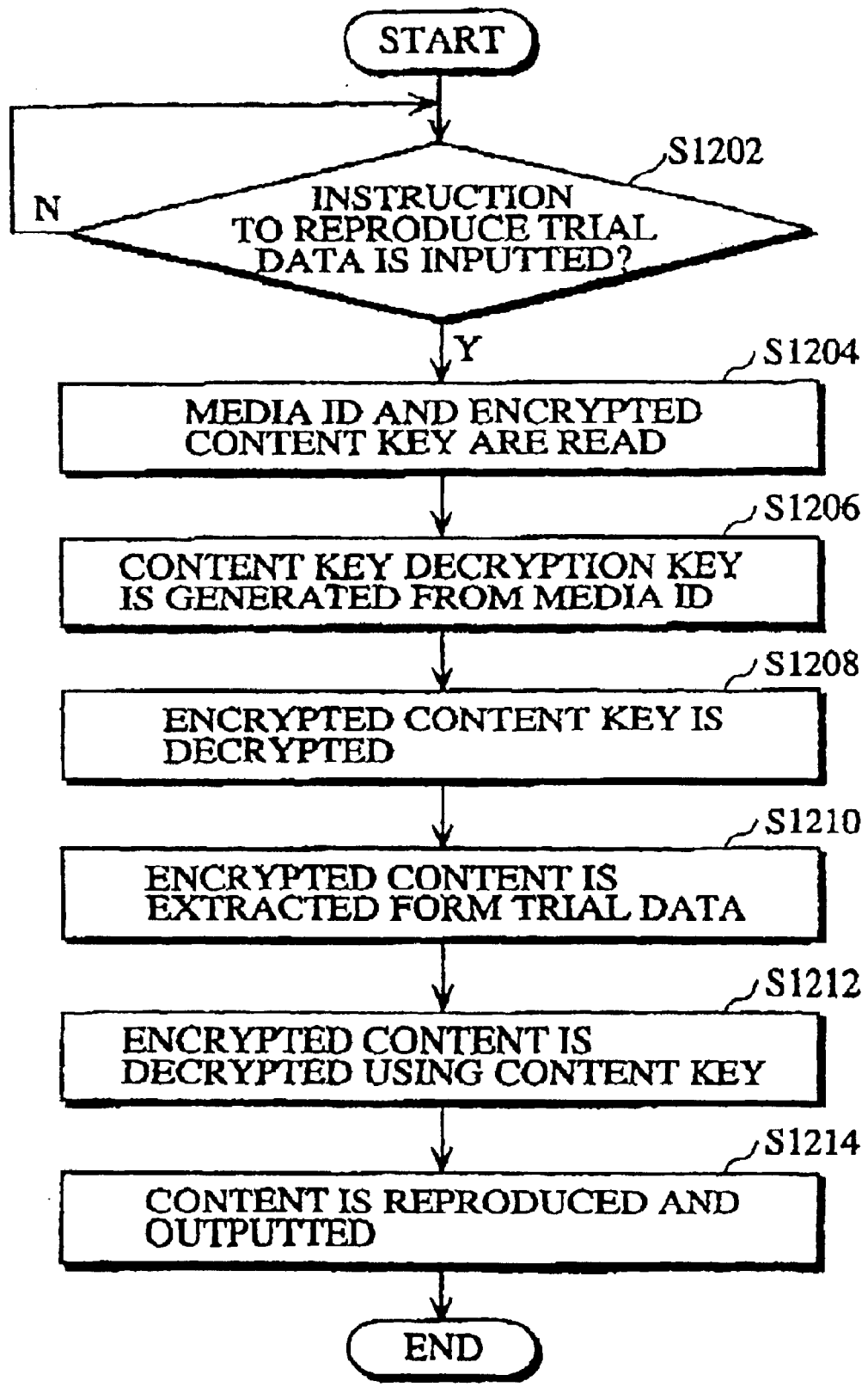
FIG. 12 is a flowchart showing the operation of the portable player.

The operation of the portable player 111 having this construction is described below with reference to the flowchart shown in FIG. 12.

The secure data area access unit 1101 waits for the instruction to reproduce trial data to be inputted (S1202). When the instruction is inputted, the secure data area access unit 1101 accesses the secure data area 205 of the semiconductor memory card 101 and reads the media ID 300 and the encrypted first content key 301 from the secure data area 205 (S1204).

The content key decryption key generating unit 1102 generates a content key decryption key from the media ID 300 (S1206).

The content key decryption unit 1103 decrypts the encrypted first content key 301 using the content key decryption key (S1208).

The data area access unit 1104 reads the encrypted content 401 included in the trial data 103 from the data area 206 of the semiconductor memory card 101 (S1210).

The content decryption unit 1105 decrypts the encrypted content 401 using the first content key (S1212).

The reproducing unit 1106 reproduces and outputs the decrypted content 401 (S1214). In this manner, the processing is completed.

Figure 13:
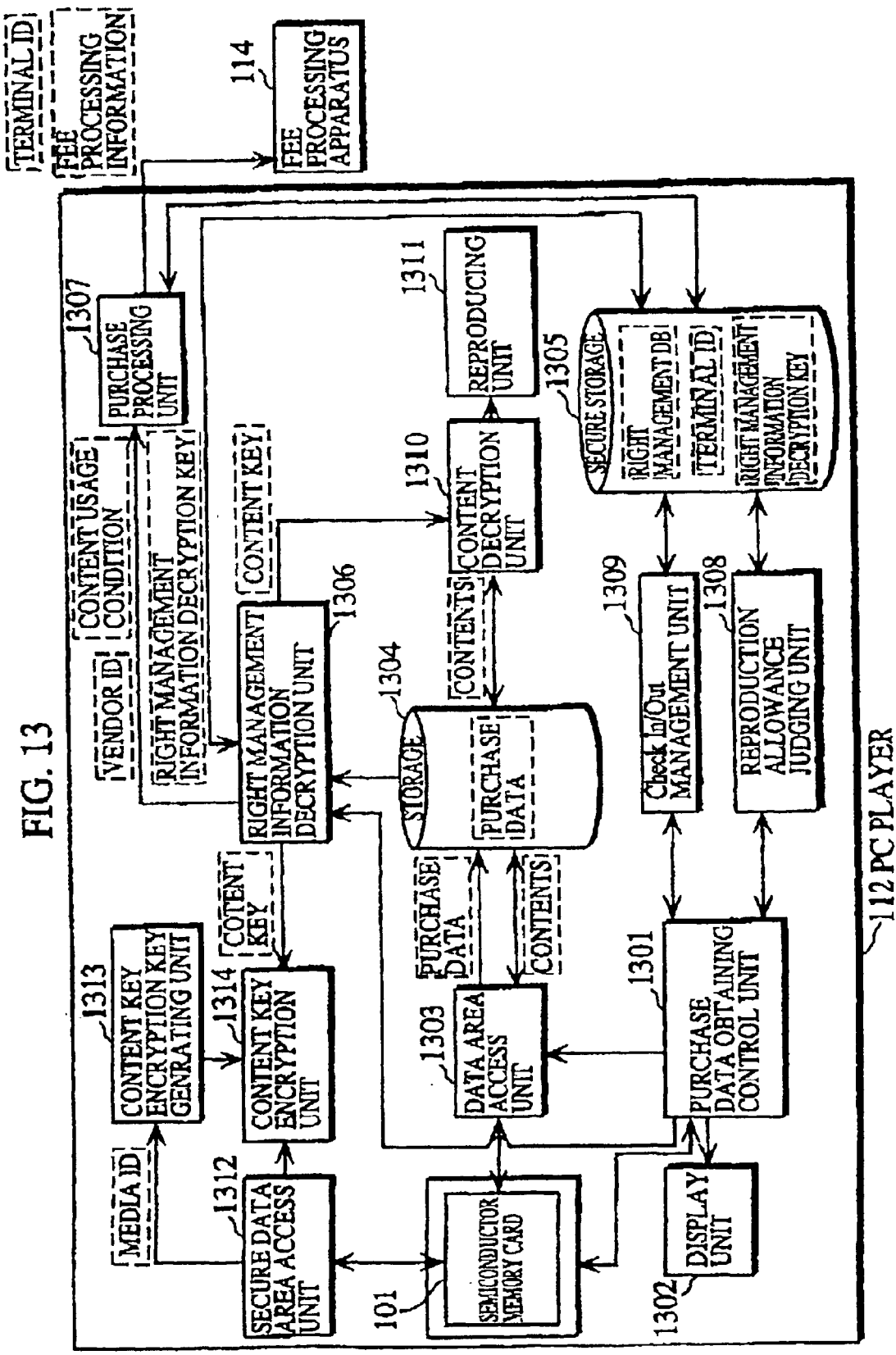
FIG. 13 shows the construction of a PC player of the embodiment.

FIG. 13 shows the construction of the PC player 112 of the present embodiment. The PC player 112 performs purchase processing for the content 701 included in the purchase data 105 in the data area 206 of the semiconductor memory card 101. The PC player 112 also records and reproduces contents.

As shown in FIG. 13, the PC player 112 includes a purchase data obtaining control unit 1301, a display unit 1302, a data area access unit 1303, a storage 1304, a secure storage 1305, a right management information decryption unit 1306, a purchase processing unit 1307, a reproduction allowance judging unit 1308, a Check In/Out management unit 1309, a content decryption unit 1310, a reproducing unit 1311, a secure data area access unit 1312, a content key encryption key generating unit 1313, and a content key encryption unit 1314. The PC player 112 having this construction is connected to the semiconductor memory card 101 and the purchase processing unit 1307 is connected to the external fee processing apparatus 114 via a public line network.

The purchase data obtaining control unit 1301 performs the following operations, if the PC player 112 is connected to the semiconductor memory card 101 and a user inputs an instruction to perform purchase processing. The purchase data obtaining control unit 1301 instructs the data area access unit 1303 to read the purchase data 105 and instructs the right management information decryption unit 1306 to decrypt the right management information 703.

Figure 14:
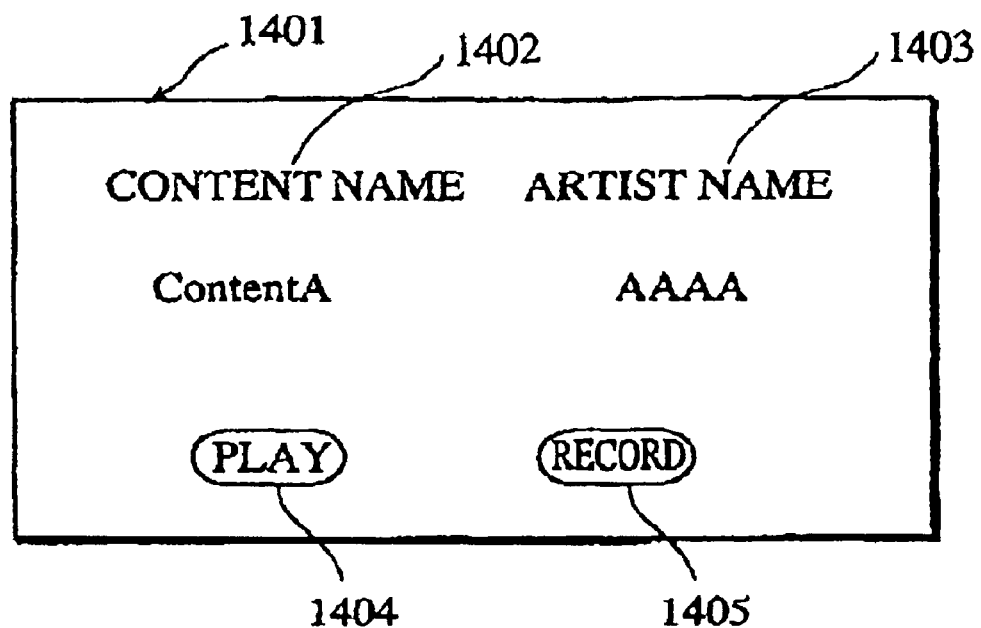
FIG. 14 shows an example of the display screen that is displayed by a display unit of the embodiment.

The purchase data obtaining control unit 1301 then receives the content information 702 from the data area access unit 1303, extracts the content name and artist name from the content information 702, generates a display screen 1401 shown in FIG. 14, and instructs the display unit 1302 to display the generated display screen. As shown in FIG. 14, the display screen 1401 includes a content name 1402, an artist name 1403, a "Play" button 1404, and a "Record" button 1405.

If the user clicks on the "Play" button 1404 in the display screen 1401 displayed by the display unit 1302, the purchase data obtaining control unit 1301 informs the reproduction allowance judging unit 1308 that the "Play" button 1404 is clicked on and sends content identification information to the reproduction allowance judging unit 1308. If the user clicks on the "Record" button 1405 in the display screen 1401, the purchase data obtaining control unit 1301 informs the Check In/Out management unit 1309 that the "Record" button 1405 is clicked on and sends the content identification information to the Check In/Out management unit 1309.

If informed by the reproduction allowance judging unit 1308 that it is allowed to reproduce the content 701 included in the purchase data 105, the purchase data obtaining control unit 1301 informs the right management information decryption unit 1306 that the content 701 should be reproduced. Also, if informed that it is not allowed to reproduce the content 701, the purchase data obtaining unit 1301 instructs the display unit 1302 to display a message showing that the reproduction of the content 701 is impossible.

If informed by the Check In/Out management unit 1309 that it is allowed to record the content 701, the purchase data obtaining control unit 1301 informs the right management information decryption unit 1306 that the content 701 should be recorded and instructs the data area access unit 1303 to record the content 701 with content identification information. Also, it informed that it is not allowed to record the content 701, the purchase data obtaining unit 1301 instructs the display unit 1302 to display a message showing that the recording of the content 701 is impossible.

The display unit 1302 includes a liquid crystal display and performs the following operations. The display unit 1302 displays the display screen 1401, through which the user inputs instructions to reproduce and record the purchase data 105, and display messages showing that the reproduction and recording are impossible.

The data area access unit 1303 is instructed by the purchase data obtaining control unit 1301 to read the purchase data 105. The data area access unit 1303 then reads the purchase data source information 102 corresponding to the trial data 103 in the data area 206 of the semiconductor memory card 101, accesses the data area 206 according to the address given by the read purchase data source information 102, and reads the purchase data 105 from the data area 206. Following this, the data area access unit 1303 stores the read purchase data 105 in the storage 1304 and sends the content information 702 of the purchase data 105 to the purchase data obtaining control unit 1301.

Also, on receiving content identification information from the purchase data obtaining control unit 1301 and being informed by the purchase data obtaining control unit 1301 that the content 701 should be recorded, the data area access unit 1303 reads the content 701 included in the purchase data 105 from the storage 1304 and records the read content 701 in the data area 206 of a semiconductor memory card (the semiconductor memory card 101, from which the purchase data 105 was read, or another semiconductor memory card).

The storage 1304 includes a hard disk and stores the purchase data 105 that the data area access unit 1303 has read from the semiconductor memory card 101.

The secure storage 1305 includes a hard disk and provides an area that is secured by an application program concerning purchase processing for purchase data. The secure storage 1305 prestores a right management information decryption key and a terminal ID assigned to the PC player 112. Also, the secure storage 1305 stores a right management DB (database) written by the purchase processing unit 1307.

FIG. 15 shows an example content of the right management DB. The right management DB 1501 gives one or more information sets, each of which includes content identification information 1502 used to identify a content, reproduction allowance 1503 showing whether it is allowed for the PC player 112 to reproduce the content, and a Check Out counter value 1504. Each time purchase processing is performed for a content included in purchase data, the purchase processing unit 1307 generates one information set for the content according to a corresponding content usage condition 705 and adds the generated information set to the right management DB 1501.

The right management information decryption unit 1306 performs the following operations, if instructed by the purchase data obtaining control unit 103 to decrypt right management information. The right management information decryption unit 1306 first reads the right management information decryption key from the secure storage 1305.

The right management information decryption unit 1306 then reads the right management information 703 included in the purchase data 105 from the storage 1304 and decrypts the read right management information 703 using the read right management information decryption key. Following this, the right management information decryption unit 1306 sends the content information 704, the content usage condition 705, and the vendor ID 706, which are included in the decrypted right management information 703, to the purchase processing unit 1307.

If instructed by the purchase data obtaining control unit 1301 to reproduce a content, the right management information decryption unit 1306 sends the decrypted second content key to the content decryption unit 1310. If the purchase processing unit 1307 is yet to perform purchase processing for the content, the right management information decryption unit 1306 instructs the purchase processing unit 1307 to perform the purchase processing before sending the decrypted second content key to the content decryption unit 1310.

If instructed by the purchase data obtaining control unit 1301 to record a content, the right management information decryption unit 1306 instructs the purchase processing unit 1307 to perform purchase processing for the content and update the Check Out counter value 1504, and sends the decrypted second content key to the content key encryption unit 1314.

The purchase processing unit 1307 receives decrypted content usage condition from the right management information decryption unit 1306 and adds necessary information to the right management DB in the secure storage 1305.

Figure 16:
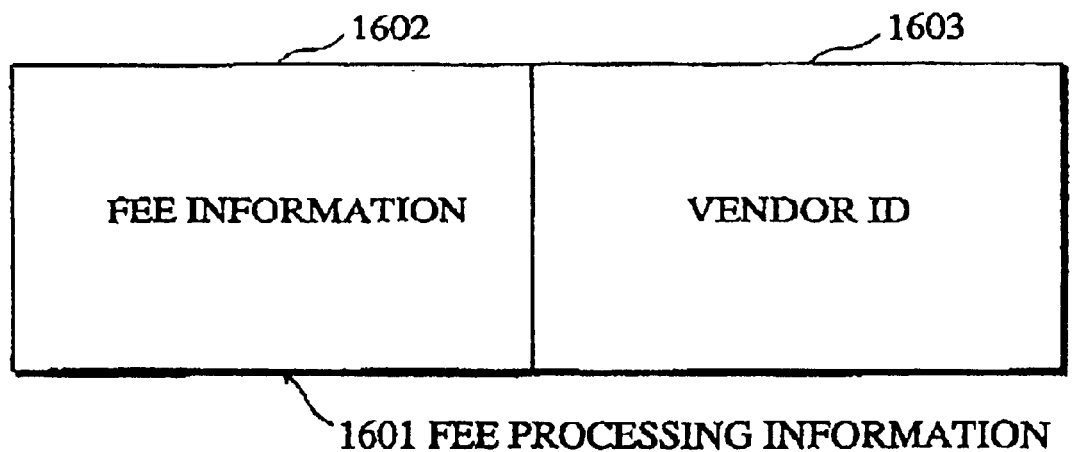
FIG. 16 shows an example of fee processing information transmitted from the PC player to a fee processing apparatus.

FIG. 16 shows an example of fee processing information. As shown in this drawing, fee processing information 1601 includes fee information 1602 and a vendor ID 1603. The fee information 1602 includes a purchase date and time, a price, and content identification information.

If instructed to perform purchase processing, the purchase processing unit 1307 sends the fee processing information 1601 and the terminal ID to the fee processing apparatus 114 via a public line network.

It should be noted here that if instructed to perform purchase processing, the purchase processing unit 1307 may store the fee processing information 1601 in the secure storage 1305. In this case, the purchase processing unit 1307 sends the stored information to the fee processing apparatus 114 each time a predetermined period of time (such as a month) has passed or the total of fees to be paid exceeds a predetermined amount (such as 1000 Yen).

The reproduction allowance judging unit 1308 receives content identification information and a notification that a corresponding content should be reproduced from the purchase data obtaining control unit 1301, and examines the right management DB 1501 in the secure storage 1305 to determine whether the reproduction allowance 1503 corresponding to the content identification information is set as "Yes". If the corresponding reproduction allowance 1503 is set as "Yes", the reproduction allowance judging unit 1308 informs the purchase data obtaining control unit 1301 that it is allowed to reproduce the content. If the corresponding reproduction allowance 1503 is set as "No", the reproduction allowance judging unit 1308 informs the purchase data obtaining control unit 1301 that it is not allowed to reproduce the content.

The Check In/Out management unit 1309 receives the content identification information and a notification that a corresponding content should be recorded from the purchase data obtaining control unit 1301. The Check In/Out management unit 1309 then examines the right management DB 1501 in the secure storage 1305 to determine whether the Check Out counter value 1504 corresponding to the content identification information is at least one. If the corresponding Check Out counter value 1504 is at least one, the Check In/Out management unit 1309 inform the purchase data obtaining control unit 1301 that it is possible to record the content and decrements the Check Out counter value 1504 by one. If the corresponding Check Out counter value 1504 is zero, the Check In/Out management unit 1309 informs the purchase data obtaining control unit 1301 that it in impossible to record the content.

The content decryption unit 1310 receives the second content key from the right management information decryption unit 1306. The content decryption unit 1310 then reads the encrypted content 701 included in the purchase data 105 from the storage 1304, decrypts the encrypted content 701 using the second content key, and sends the decrypted content 701 to the reproducing unit 1311.

The reproducing unit 1311 receives the decrypted content 701 from the content decryption unit 1310. The reproducing unit 1311 then reproduces the decrypted content 701 and outputs music using speakers.

The secure data area access unit 1312 reads the media ID 300 from the secure data area 205 and sends the read media ID 300 to the content key encryption key generating unit 1313, if instructed by the content key encryption unit 1314 to read the media ID 300 from the semiconductor memory card 101. Also, if receiving the encrypted second content key from the content key encryption unit 1314, the secure data area access unit 1312 records the encrypted second content key in the secure data area 205 of the semiconductor memory card 101.

The content key encryption key generating unit 1313 receives the media ID 300 from the secure data area access unit 1312. The content key encryption key generating unit 1313 then generates a content key encryption key, which is to be used to encrypt the second content key, from the media ID 300 and sends the content key encryption key to the content key encryption unit 1314.

The content key encryption unit 1314 receives the second content key from the right management information decryption unit 1306 and instructs the secure data area access unit 1312 to read the media ID 300 from the secure data area 205. The content key encryption unit 1314 also receives the content key encryption key from the content key encryption key generating unit 1313, encrypts the second content key using the content key encryption key, and sends the encrypted second content key to the secure data area access unit 1312.

Figure 17:
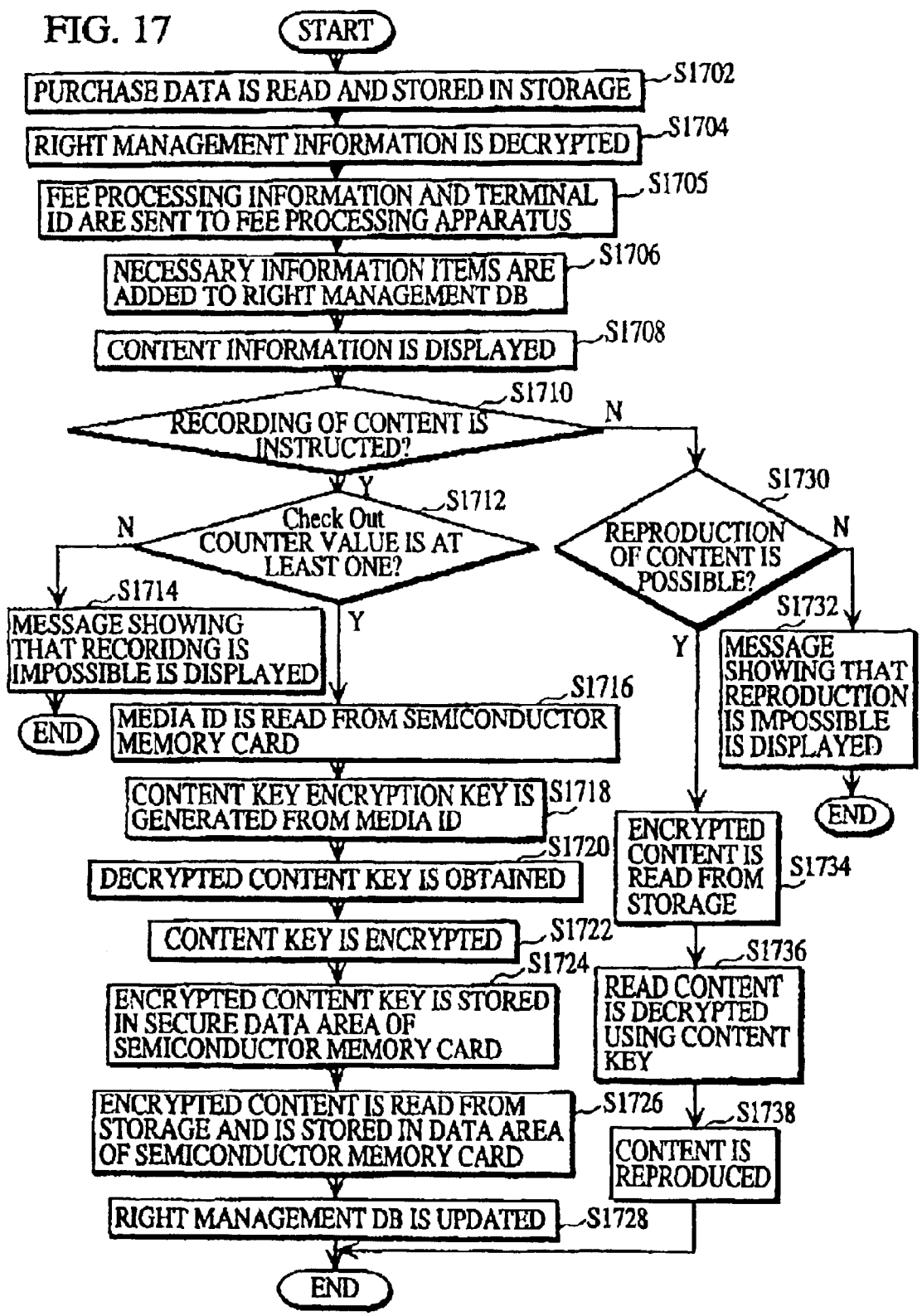
FIG. 17 is a flowchart showing the operation of the PC player during the recording and reproduction of a content.

The operation of the PC player 112 during the recording and reproduction of the content 701 included in the purchase data 105 is described below with reference to the flowchart shown in FIG. 17.

The PC player 112 is connected to the semiconductor memory card 101 that records the purchase data 105. After receiving an instruction to perform purchase processing from the user, the purchase data obtaining control unit 1301 instructs the data area access unit 1303 to read the purchase data 105. The data area access unit 1303 reads the purchase data 105 from the data area 206 of the semiconductor memory card 101 and stores the read purchase data 105 in the storage 1304 (S1702).

The right management information decryption unit 1306 reads the right management information decryption key from the secure storage 1305 and decrypt the right management information 703 in the storage 1304 using the right management information decryption key (S1704).

The purchase processing unit 1307 sends the fee processing information 1601 and the terminal ID to the fee processing apparatus 114 via the public line network and performs fee processing (S1705).

The right management information decryption unit 1306 adds necessary information items included in the decrypted right management information to the right management DB in the secure storage 1305 (S1706).

The purchase data obtaining control unit 1301 instructs the display unit 1302 to display the display screen 1401 that includes the "Play" button 1404 and the "Record" button 1405 (S1708). By clicking on the button 1404 or 1405, the user selects the content name 1402 and the artist name 1403 included in the content information 702 and inputs an instruction to reproduce or record the content 701 (S1708).

The purchase data obtaining control unit 1301 judges whether the user inputted an instruction to record the content 701 or an instruction to reproduce the content 701 (S1710).

If the user inputted an instruction to record the content 701, the Check In/Out management unit 1309 judges whether a corresponding Check Out counter value 1504 in the right management DB 1501 in the secure storage 1305 is at least one (S1712). If the corresponding Check Out counter value 1504 is zero, the purchase data obtaining control unit 1301 instructs the display unit 1302 to display a message showing that the recording is impossible (S1714).

If the corresponding Check Out counter value 1504 is at least one, the secure data area access unit 1312 reads the media ID 300 from the secure data area 205 of a semiconductor memory card (the semiconductor memory card 101, from which the purchase data 105 was read, or another semiconductor memory card) (S1716).

The content key encryption key generating unit 1313 generates a content key encryption key from the read media ID 300 (S1718).

The content encryption unit 1314 obtains the decrypted second content key (S1720) and encrypts the obtained second content key using the content key encryption-key (S1722).

The secure data area access unit 1312 stores the encrypted second content key in the secure data area 205 of the semiconductor memory card (S1724).

The data area access unit 1303 reads the encrypted content 701 from the storage 1304 and stores the read content in the data area 206 of the semiconductor memory card (S1726).

The Check In/Out management unit 1309 decrements the corresponding Check Out counter value 1504 in the right management DB 1501 in the secure storage 1305 by one (S1728). In this manner, the processing is completed.

If the purchase data obtaining control unit 1301 judges that the user inputted an instruction to reproduce the content 701 in S1710, the reproduction allowance judging unit 1308 judges whether a corresponding reproduction allowance 1503 in the right management DB 1501 in the secure storage 1305 is set as "Yes" (S1730).

If the corresponding reproduction allowance 1503 is set as "No", the purchase data obtaining control unit 1301 instructs the display unit 1302 to display a message showing that the reproduction is impossible (S1732). Then the processing is terminated.

If the corresponding reproduction allowance 1503 is set as "Yes" and the reproduction is possible, the content decryption unit 1310 receives the second content key from the right management information decryption unit 1306, reads the encrypted content from the storage 1304 (S1734), and decrypts the read content using the received second content key (S1736). The reproducing unit 1311 reproduces and outputs the decrypted content (S1738). In this manner, the processing is completed.

Figure 18:
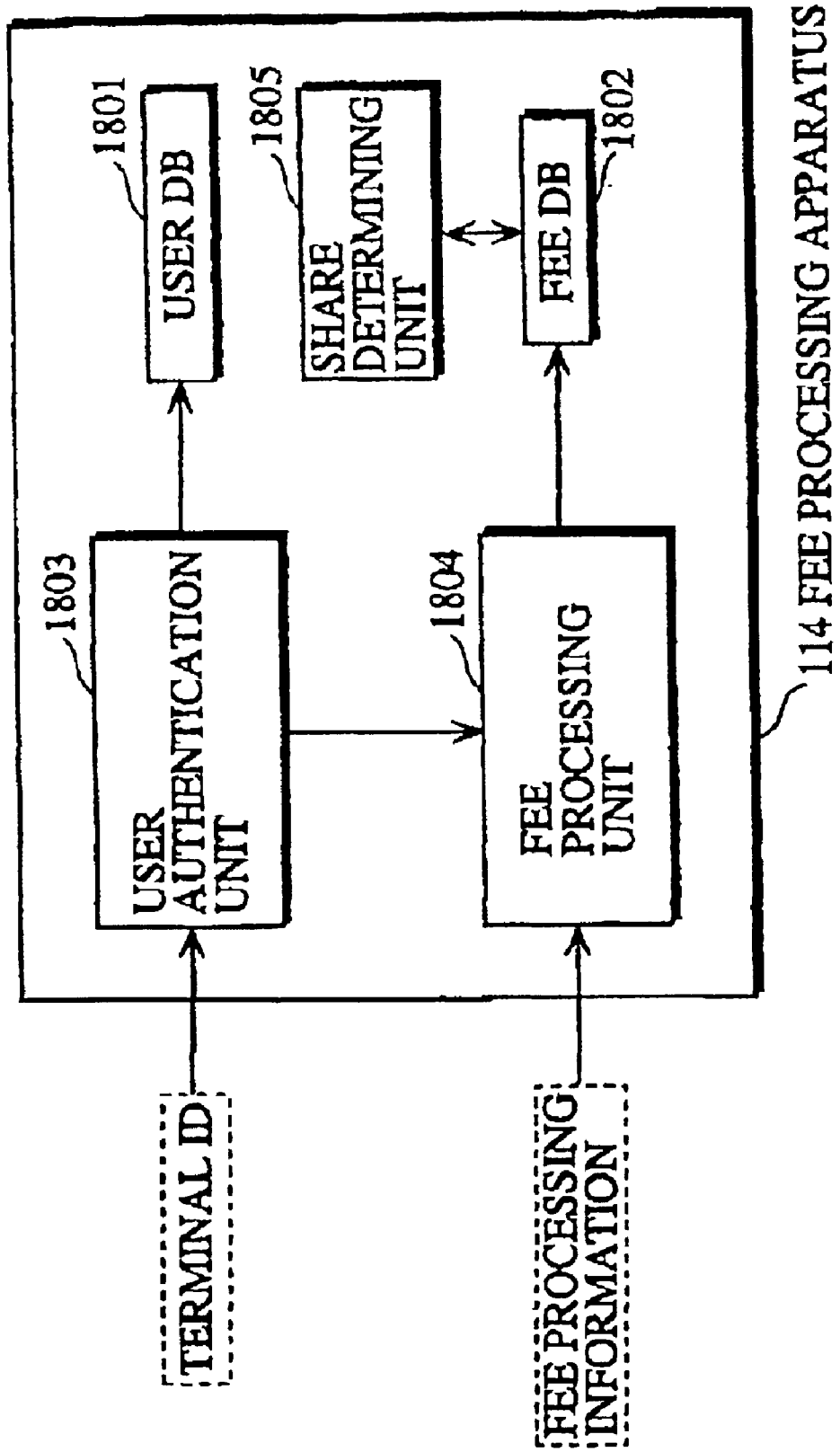
FIG. 18 shows the construction of the fee processing apparatus.

FIG. 18 shows the construction of the fee processing apparatus 114 of the present embodiment. As shown in this drawing, the fee processing apparatus 114 includes a user DB 1801, a fee DB 1802, a user authentication unit 1803, a fee processing unit 1804, and a share determining unit 1805.

Each of the user DB 1801 and the fee DB 1802 includes a hard disk.

FIG. 19 shows an example content of the user DB 1801.

As shown in this drawing, the user DB 1801 gives one or more information sets, each of which includes a user ID 1901, a terminal ID 1902, a name 1903, and a card number 1904.

The user ID 1901 is an identifier assigned to the user who bought the purchase data 105.

The terminal ID 1902 is an identifier assigned to the PC player 112.

The name 1903 is the name of the user assigned the user ID 1901.

The card number 1904 is a card number of the credit card used by the user to make a payment.

FIG. 20 shows an example content of the fee DB 1802.

As shown in this drawing, the fee DB 1802 gives one or more information sets, each of which includes a date and time 2001, a user ID 2002, content identification information 2003, an amount 2004, and a vendor ID 2005.

The date and time 2001 shows when a user purchased content. The user ID 2002 is an identifier assigned to the user who purchased the content. The content identification information 2003 is information used to identify the purchased content. The amount 2004 is a fee corresponding to the price 801 shown in the content usage condition 705. The vendor ID 2005 is an identifier assigned to the card vendor that sold the semiconductor memory card, and corresponds to the vendor ID 1603 included in the fee processing information 1601 sent from the purchase processing unit 1307. The vendor ID 2005 giving a sign "-" means that a content other than the content included in the purchase data in the semiconductor memory card is purchased (that is, a content is downloaded and purchased via a network).

The user authentication unit 1803 receives the terminal ID from the PC player. The user authentication unit 1803 then confirms that the received terminal ID corresponds to a terminal ID registered in the user DB 1801 and informs the fee processing unit 1804 of a corresponding user ID.

The fee processing unit 1804 registers fee processing information sent from the PC player in the fee DB. When doing so, the fee processing unit 1804 registers the user ID informed by the user authentication unit 1803 in the fee DB.

The share determining unit 1805 determines the amount of a promotion share that should be paid to each vendor. The share determining unit 1805 performs this operation by referring to the fee DB at predetermined periods (such as every month).

The share determining unit 1805 then calculates a total Ti of amounts 2004 for each vendor ID and determines the amount Mi of a promotion share for each vendor by multiplying the total Ti by a predetermined coefficient k (0<k<1 ("k=0.1", for instance)).

The promotion share for each vendor is paid by the clearing house 113.

The operation of the fee processing apparatus 114 having this construction is described below with reference to the flowchart shown in FIG. 21.

The fee processing apparatus 114 receives the terminal ID and fee processing information from the PC player 112 (S2102).

The user authentication unit 1803 searches the user DB 1801 for the received terminal ID (S2104). If the received terminal ID is not registered in the user DB 1801, the processing returns to S2102. If the received terminal ID is registered in the user DB 1801, the user authentication unit 1803 informs the fee processing unit 1804 of a corresponding user ID (S2106).

The fee processing unit 1804 registers the informed user ID and the received fee processing information in the fee DB 1802 (S2108).

The stated operations are performed at predetermined dates and times (such as every month on 20th at 0:00 a.m.) (S2110).

The share determining unit 1805 calculates a total Ti of amounts 2004 for each vendor assigned one vendor ID by referring to the fee DB 1802 (S2112). The share determining unit 1805 then calculates the amount Mi of a promotion share for each vendor according to a formula "Mi-k*Ti" (S2114) and outputs each calculated amount Mi (S2116). Then the processing returns to S2102.

It should be noted here that in the embodiment described above, the songs recorded as a content for promotion are the same as those recorded as the content included in the purchase data. However, the promotion content may be only representative songs of an artist and the content included in the purchase data may be a plurality of songs in the latest album of the artist.

Also, although each content is music data in the embodiment, the present invention is not limited to this. That is, each content may be still image data or video data.

Further, in the embodiment, the constructions of the recording apparatus 107, the portable player 111, the PC player 112, and the fee processing apparatus 114 are respectively shown in FIGS. 9, 11, 13, and 18 and the functions of their construction elements are described. However, these apparatuses and players may be realized as program. In this case, computers achieve the functions of their construction elements by executing the programs. Also, these programs may be stored in computer-readable recording media and the recording media may be applied to apparatuses that do not have the construction elements of the present invention. In this case, the effect of the present invention is also achieved by the apparatuses.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

Industrial Use Possibility

With the semiconductor memory card of the present invention that records contents for trial and purchase, the download of contents via the Internet becomes unnecessary and contents are easily obtained. Also, the PC player of the present invention reproduces and records contents for purchase related to trial contents without difficulty, and so is applicable to the recording of contents such as music data.

What is claimed is:

1. A semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, and wherein the apparatus, when accessing said semiconductor memory card, performs an authentication process.

2. The semiconductor memory card of claim 1, wherein the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed.

3. The semiconductor memory card of claim 2, wherein the purchase data further includes encrypted management information, a part of the encrypted management information being the second encrypted content key and a remaining part of the encrypted management information including a vendor ID and a usage condition, the vendor ID being uniquely assigned to a card vendor that records the trial data and the purchase data in the semiconductor memory card, and the usage condition including a purchase price of the purchase data.

4. The semiconductor memory card of claim 2, wherein the purchase data further includes encrypted management information, a part of the encrypted management information being the second encrypted content key and a remaining part of the encrypted management information including a usage condition concerning the purchase data, the usage condition including a number of check outs allowed and a reproduction allowance, each check out being a conversion of the purchase data into a format in which the purchase data is able to be decrypted according to the information in the semiconductor memory card, and the reproduction allowance showing whether an apparatus that performs purchase processing for the purchase data is allowed to reproduce the purchase data.

5. A recording apparatus that records data in a semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, the recording apparatus comprising:

a content storage unit operable to store a plurality of contents;

a content key generating unit operable to generate a plurality of content key used to encrypt the plurality of contents;

a first encrypted content key generating unit operable to obtain the media ID from the semiconductor memory card and generate a first encrypted content key by encrypting a first content key, out of the plurality of content key, using the obtained media ID;

a first recording unit operable to record the first encrypted content key in the secure data area;

a first encryption unit operable to read a first content, out of the plurality of contents, from the content storage unit and generate a first encrypted content by encrypting the first content using the first content key;

a second recording unit operable to record data including the first encrypted content in the non-secure data area as trial data;

a second encrypted content key generating unit operable to generate a second encrypted content key by encrypting a second content key, out of the plurality of content key;

a second encryption unit operable to read a second content related to the first content from the content storage unit and generate a second encrypted content by encrypting the second content using the second content key; and a third recording unit operable to record data including the second encrypted content in the non-secure data area as purchase data.

6. The recording apparatus of claim 5, wherein the data recorded by the third recording unit includes the second encrypted content key in addition to the second encrypted content.

7. A recording and reproducing apparatus that records and reproduces purchase data in a semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, wherein the recording and reproducing apparatus comprises:

a data reading unit operable to read the purchase data from the non-secure data area;

a purchase data storage unit operable to store the read purchase data;

a decrypted content generating unit operable to generate a decrypted content by decrypting the second encrypted content included in the stored purchase data using a prestored decryption key;

a reproducing unit operable to reproduce and output the decrypted contents;

a media ID reading unit operable to read a media ID from a secure data area of a destination semiconductor memory card;

an encryption recording unit operable to generate a second encrypted content key by encrypting a second decrypted content key using the read media ID and record the second encrypted content key in the secure data area of the destination semiconductor memory card, the second decrypted content key being generated by decrypting the second content key using the prestored decryption key; and a content recording unit operable to record the second encrypted content included in the stored purchase data in a non-secure data area of the destination semiconductor memory card.

8. A recording and reproducing apparatus that records and reproduces purchase data in a semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, wherein the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, wherein the recording and reproducing apparatus comprises:

a data reading unit operable to read the purchase data from the non-secure data area;

a purchase data storage unit operable to store the read purchase data;

a second decrypted content key generating unit operable to generate a second decrypted content key by decrypting the second encrypted content key included in the stored purchase data using a prestored decryption key;

a decrypted content generating unit operable to generate a decrypted content by decrypting the second encrypted content included in the stored purchase data using the second decrypted content key;

a reproducing unit operable to reproduce and output the decrypted content;

a media ID reading unit operable to read a media ID from a secure data area of a destination semiconductor memory card;

an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card.

9. The recording and reproducing apparatus of claim 8, wherein the purchase data further includes encrypted management information, a part of the encrypted management information being the second encrypted content key and a remaining part of the encrypted management information including a usage condition concerning the purchase data, the usage condition including a number of check outs allowed and a reproduction allowance, each check out being a conversion of the purchase data into a format in which the purchase data is able to be decrypted according to the information in the semiconductor memory card, and the reproduction allowance showing whether an apparatus that performs purchase processing for the purchase data is allowed to reproduce the purchase data, wherein the recording and reproducing apparatus further comprises:

a usage condition storage unit operable to store a usage condition included in decrypted management information;

a first judging unit operable to judge whether a user's instruction designates a reproduction or recording of the stored purchase data;

a second judging unit operable to judge whether the stored usage condition shows that the reproduction is allowed, if the first judging unit has judged that the user's instruction designates the reproduction;

a reproduction control unit operable to activate the decrypted content generating unit and the reproducing unit if the second judging unit has judged that the reproduction is allowed;

a third judging unit operable to judge whether the recording is allowed by ref erring to the stored usage condition, if the first judging unit has judged that the user's instruction designates the recording;

a recording control unit operable to activate the media ID reading unit, the encryption recording unit, and the content recording unit if the third judging unit has judged that the recording is allowed; and a displaying unit operable to display a message for the user if the second judging unit has judged that the reproduction is not allowed or if the third judging unit has judged that the recording is not allowed.

10. The recording and reproducing apparatus of claim 9, wherein the third judging unit judges that the recording is allowed if the number of check outs allowed, which is included in the stored usage condition, is at least one, the recording and reproducing apparatus further comprising:

an updating unit operable to decrement the included number of check outs allowed by one, after the content recording unit records the second encrypted content in the non-secure data area.

11. A sales method for a semiconductor memory card that prestores a media-ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, wherein the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, wherein the purchase data further includes encrypted management information, a part of the encrypted management information being the second encrypted content key and a remaining part of the encrypted management information including a vendor ID and a usage condition, the vendor ID being uniquely assigned to a card vendor that records the trial data and the purchase data in the semiconductor memory card, and the usage condition including a purchase price of the purchase data, wherein via a public line network, a fee processing apparatus is connected to a recording and reproducing apparatus that comprises:

a data reading unit operable to read the purchase data from the non-secure data area;

a purchase data storage unit operable to store the read purchase data;

a second decrypted content key generating unit operable to generate a second decrypted content key by decrypting the second encrypted content key included in the stored purchase data using a prestored decryption key;

a decrypted content generating unit operable to generate a decrypted content by decrypting the second encrypted content included in the stored purchase data using the second decrypted content key;

a reproducing unit operable to reproduce and output the decrypted content;

a media ID reading unit operable to read a media ID from a secure data area of a destination semiconductor memory card;

an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card;

wherein the sales method comprises:

a storing step where when reproducing or recording a content included in the purchase data for a first time, the recording and reproducing apparatus stores fee processing information that includes a purchase price for the content;

a transmission step where the recording and reproducing apparatus transmits, to the fee processing apparatus, the fee processing information, a terminal ID prestored in the recording and reproducing apparatus, and a vendor ID;

a calculating step where the fee processing apparatus calculates a contribution degree for each card vendor from a piece of the fee processing information that corresponds to a vendor ID assigned to the card vendor; and a determining step where the fee processing apparatus determines a share of a profit to be paid to the card vendor according to the calculated contribution degree.

12. A program applied to a recording and reproducing apparatus that records and reproduces purchase data in a semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, wherein the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, wherein the program has the recording and reproducing apparatus achieve the following units:

a data reading and storing unit operable to read the purchase data from the non-secure data area and store the read purchase data in a recording area;

a second decrypted content key generating unit operable to generate a second decrypted content key by decrypting the second encrypted content key included in the stored purchase data using a prestored decryption key;

a decrypted content generating unit operable to generate a decrypted content by decrypting the second encrypted content included in the stored purchase data using the second decrypted content key;

a reproducing unit operable to reproduce and output the decrypted content;

a media ID reading unit operable to read a media ID from a secure data area of a destination semiconductor memory card;

an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card.

13. A computer-readable recording medium applied to a recording and reproducing apparatus that records and reproduces purchase data in a semiconductor memory card that prestores a media ID uniquely assigned thereto and comprises a secure data area and a non-secure data area, the secure data area being accessible by an apparatus if authenticity of the apparatus is verified, and the non-secure data area being accessible by the apparatus regardless of whether the authenticity is verified, wherein the secure data area stores a first encrypted content key that is generated by encrypting a first content key using the media ID, and the non-secure data area stores trial data, which is able to be decrypted by using information in the semiconductor memory card, and purchase data, which is able to be decrypted by using information both inside and outside of the semiconductor memory card, the trial data including a first encrypted content that is generated by encrypting a first content using the first content key, and the purchase data including a second encrypted content that is generated by encrypting a second content using a second content key and is to be decrypted on a condition that fee processing has been performed, the second content being related to the first content, wherein the purchase data further includes a second encrypted content key that is generated by encrypting the second content key according to a predetermined method, the second encrypted content key being to be decrypted using a decryption key that is obtained from the outside of the semiconductor memory card on the condition that the fee processing has been performed, wherein the computer-readable recording medium stores a program having the recording and reproducing apparatus achieve the following units:

a data reading and storing unit operable to read the purchase data from the non-secure data area and store the read purchase data in a recording area;

a second decrypted content key generating unit operable to generate a second decrypted content key by decrypting the second encrypted content key included in the stored purchase data using a prestored decryption key;

a decrypted content generating unit operable to generate a decrypted content by decrypting the second encrypted content included in the stored purchase data using the second decrypted content key;

a reproducing unit operable to reproduce and output the decrypted content;

a media ID reading unit operable to read a media ID from a secure data area of a destination semiconductor memory card;

an encryption recording unit operable to generate a second encrypted content key by encrypting the second decrypted content key using the read media ID and record the second encrypted content key in the secure data area of the destination semiconductor memory card; and a content recording unit operable to record the second encrypted content included in the stored purchase data in a non-secure data area of the destination semiconductor memory card.

* * * * *

UNITED STATES PATENT AND TRADEMARK OFFICE
CERTIFICATE OF CORRECTION

PATENT NO. : 6,901,385 B2
DATED : May 31, 2005
INVENTOR(S) : Ryuichi Okamoto et al.

It is certified that error appears in the above-identified patent and that said Letters Patent is hereby corrected as shown below:

Title page,
Item [56], References Cited, OTHER PUBLICATIONS, "IBM Technical Bulletin" reference, please add -- Disclosure -- after "Technical" and before "Bulletin".
"IBM Technical Bulletin" reference, please change "1998" to -- 1988 -- after "Feb." and before ";".
Item [57], ABSTRACT,
Line 5, please change "are" to -- area -- after "secure" and before "is".
Item [75], Inventors, please add -- ; Masayuki Kozuka, Arcadia, CA (US) -- after "(US)".

Column 22,
Line 59, please change "," to -- ; -- after "content" and before "and".

Column 23,
Line 36, please change "are a" to -- area -- after "data" and before "being".

Column 26,
Line 22, please change "ref erring" to -- referring -- after "by" and before "to".
Line 44, please change "media-ID" to -- media ID -- after "a" and before "uniquely".

Signed and Sealed this

Thirtieth Day of August, 2005

JON W. DUDAS
*Director of the United States Patent and Trademark Office*